(12) United States Patent
Kim et al.

(10) Patent No.: US 10,295,717 B2
(45) Date of Patent: May 21, 2019

(54) WIRE GRID POLARIZING PLATE, DISPLAY DEVICE INCLUDING THE SAME, AND METHOD OF FABRICATING SAID DISPLAY DEVICE

(71) Applicant: SAMSUNG DISPLAY CO., LTD., Yongin, Gyeonggi-do (KR)

(72) Inventors: Tae Woo Kim, Seoul (KR); Seung Won Park, Seoul (KR); Moon Gyu Lee, Suwon-si (KR); Lei Xie, Suwon-si (KR); Dae Ho Yoon, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/910,917

(22) Filed: Mar. 2, 2018

(65) Prior Publication Data

US 2018/0188433 A1    Jul. 5, 2018

Related U.S. Application Data

(63) Continuation of application No. 14/945,328, filed on Nov. 18, 2015, now Pat. No. 9,939,570.

(30) Foreign Application Priority Data

Nov. 18, 2014  (KR) .................. 10-2014-0161069
Apr. 24, 2015  (KR) .................. 10-2015-0057992

(51) Int. Cl.
*G02B 5/30*       (2006.01)
*G02F 1/1335*     (2006.01)

(52) U.S. Cl.
CPC ............. *G02B 5/3058* (2013.01); *G02F 2001/133548* (2013.01)

(58) Field of Classification Search
CPC ............. G02B 5/3058; G02F 1/133536; G02F 2001/133548; B81C 1/00031; B81C 2201/0149
(Continued)

(56) References Cited

U.S. PATENT DOCUMENTS 9,939,570 B2 * 4/2018  Kim .................. G02B 5/3058
2006/0027290 A1   2/2006  Iguchi et al.
(Continued)

FOREIGN PATENT DOCUMENTS

EP   2322979 A1     5/2011
JP   2010224232 A  10/2010
(Continued)

OTHER PUBLICATIONS

Yeon Sik Jung et al., "Fabrication of Diverse Metallic Nanowire Arrays Based on Block Copolymer Self-Assembly," American Chemical Society, Aug. 2010, pp. 3722-3726, vol. 10.
(Continued)

*Primary Examiner* — Frank G Font
(74) *Attorney, Agent, or Firm* — Innovation Counsel LLP

(57) ABSTRACT

Provided is a wire grid polarizing plate. The wire grid polarizing plate comprises a light-transmitting substrate and wire grid patterns which are disposed on the light-transmitting substrate, and which are arranged to transmit first polarized light and to reflect second polarized light polarized in a direction perpendicular to that of the first polarized light, the wire grid patterns comprising target patterns comprising conductive structures shaped as closed curves, at least one of the conductive structures surrounding another one of the conductive structures with a gap therebetween.

1 Claim, 34 Drawing Sheets

(58) Field of Classification Search
USPC .................. 359/485.05, 487.03; 349/96
See application file for complete search history.

(56) References Cited

U.S. PATENT DOCUMENTS

| | | |
|---|---|---|
| 2006/0119937 A1 | 6/2006 | Perkins et al. |
| 2006/0215263 A1 | 9/2006 | Mi et al. |
| 2008/0100779 A1 | 5/2008 | Choo et al. |
| 2008/0284949 A1 | 11/2008 | Matsumori et al. |
| 2009/0046362 A1 | 2/2009 | Guo et al. |
| 2009/0128893 A1 | 5/2009 | McCarthy et al. |
| 2009/0290105 A1 | 11/2009 | Takada |
| 2010/0134719 A1 | 6/2010 | Johns et al. |
| 2010/0167214 A1 | 7/2010 | Yoon et al. |
| 2010/0328768 A1 | 12/2010 | Lines et al. |
| 2012/0105970 A1 | 5/2012 | Ueda |
| 2012/0126449 A1 | 5/2012 | Hart et al. |
| 2012/0250154 A1 | 10/2012 | Davis |
| 2013/0182405 A1 | 7/2013 | Kaufman |
| 2013/0201557 A1 | 8/2013 | Davis et al. |
| 2014/0028956 A1 | 1/2014 | Choi et al. |
| 2014/0110040 A1 | 4/2014 | Cok |
| 2014/0148012 A1 | 5/2014 | Guillorn et al. |
| 2018/0188433 A1* | 7/2018 | Kim .................. G02B 5/3058 |

FOREIGN PATENT DOCUMENTS

| | | |
|---|---|---|
| KR | 10-2008-0024316 A | 3/2008 |
| KR | 10-2008-0037324 A | 4/2008 |
| KR | 10-2009-0001371 A | 1/2009 |
| KR | 10-2010-0110358 A | 10/2010 |
| KR | 10-2011-0101893 A | 9/2011 |
| KR | 10-2012-0025407 A | 3/2012 |
| KR | 10-2013-0001911 A | 1/2013 |
| KR | 10-2013-0052942 A | 5/2013 |
| KR | 10-2014-0030382 A | 3/2014 |
| KR | 10-2014-0030873 A | 3/2014 |
| KR | 10-2014-0074427 A | 6/2014 |
| KR | 10-2014-0137734 A | 12/2014 |

OTHER PUBLICATIONS

M. Serdar Onses et al., "Hierarchical Patterns of Three-Dimensional Block-Copolymer Films Formed by Electrohydrodynamic Jet Printing and Self-Assembly," Nature Nanotechnology, Sep. 2013, pp. 667-675, vol. 8.

"European Search Report," European Patent Office, dated Mar. 21, 2016, 10 pages, Munich, Germany.

Chinese Office Action corresponding to Chinese Patent Application No. 201210796667.1 dated Jan. 11, 2019 9 pages.

* cited by examiner

WIRE GRID POLARIZING PLATE, DISPLAY DEVICE INCLUDING THE SAME, AND METHOD OF FABRICATING SAID DISPLAY DEVICE

This application is a continuation application of U.S. patent application Ser. No. 14/945,328 filed on Nov. 18, 2015, which claims priority to Korean Patent Application No. 10-2014-0161069 filed on Nov. 18, 2014 and Korean Patent Application No. 10-2015-0057992 filed on Apr. 24, 2015, both filed in the Korean Intellectual Property Office (KIPO), and all the benefits accruing therefrom under 35 U.S.C. § 119, the contents of the prior applications being herein incorporated by reference.

BACKGROUND OF THE INVENTION

1. Field of the Invention

Embodiments of the present invention relate generally to flat panel displays. More specifically, embodiments of the present invention relate to a wire grid polarizing plate, a display device including the same, and a method of fabricating said display device.

2. Description of the Related Art

A wire grid is an array of parallel conductive wires placed and arranged to produce only a specific polarization of an electromagnetic wave.

A wire grid structure having a smaller period than a wavelength of unpolarized incident light reflects light polarized in the direction of its wires and transmits light polarized perpendicular to the direction of the wires. Unlike an absorptive polarizer, a wire grid polarizer can reuse reflected polarized light.

SUMMARY OF THE INVENTION

Aspects of the present invention provide a polarizing plate having improved light efficiency.

Aspects of the present invention also provide a display device having improved light efficiency.

Aspects of the present invention also provide a method of fabricating a display device having improved light efficiency.

However, aspects of the present invention are not restricted to the ones set forth herein. The above and other aspects of the present invention will become more apparent to one of ordinary skill in the art to which the present invention pertains by referencing the detailed description of the present invention given below.

According to an aspect of the present invention, there is provided a wire grid polarizing plate comprising a light-transmitting substrate and wire grid patterns. The wire grid patterns are disposed on the light-transmitting substrate and are arranged to transmit first polarized light and to reflect second polarized light polarized in a direction perpendicular to that of the first polarized light. The wire grid patterns comprise target patterns comprising conductive structures shaped as closed curves, at least one of the conductive structures surrounding another one of the conductive structures with a gap therebetween.

The conductive structures may be shaped as polygonal closed curves, and each of the conductive structures may include two first wire structures extending in a first direction and two or more second wire structures extending in a second direction different from the first direction.

The conductive structures may be shaped as non-polygonal closed curves, each of the conductive structures may include two first wire structures extending in a first direction and two or more second wire structures extending in a second direction different from the first direction. Each of the non-polygonal closed curves may comprise an arcuate portion.

Each of the wire grid patterns may further comprise third wire structures disposed between the target patterns.

The wire grid polarizing plate may further comprise reflective patterns. The reflective patterns may be disposed between the wire grid patterns and arranged to reflect both the first polarized light and the second polarized light. The third wire structures may be connected to the reflective patterns.

Two or more of the wire grid patterns may be different in area.

According to an aspect of the present invention, there is provided a display device comprising a wire grid polarizing plate which comprises a light-transmitting substrate and wire grid patterns which are disposed on the light-transmitting substrate and arranged to transmit first polarized light and to reflect second polarized light polarized in a direction perpendicular to that of the first polarized light. The display device also includes an opaque layer which is disposed on the wire grid polarizing plate. Each of the wire grid patterns comprises target patterns comprising two or more conductive structures shaped as closed curves at least one of the closed curves surrounding another one of the closed curves with a gap therebetween. Also, each of the conductive structures includes two first wire structures extending in a first direction and two or more second wire structures extending in a second direction different from the first direction, and the opaque layer covers the second wire structures.

Each of the wire grid patterns may further comprises third wire structures disposed between the target patterns.

The wire grid polarizing plate may further comprise reflective patterns. The reflective patterns may be disposed between the wire grid patterns and arranged to reflect both the first polarized light and the second polarized light. The third wire structures may be connected to the reflective patterns.

The opaque layer further may cover the reflective patterns, the reflective patterns may comprise a first reflective region extending in the first direction and a second reflective region extending perpendicular to the first direction, and the opaque layer may comprise bent first opaque regions which overlap and cover the first reflective regions and straight second opaque regions which cover the second reflective regions.

The display device may further comprise an insulating layer which is disposed on the wire grid polarizing plate, gate wirings which are disposed on the insulating layer to overlap the second reflective regions and data wirings which are disposed on the gate wirings to overlap the first reflective regions.

The opaque layer may comprise two or more openings having different areas.

The wire grid polarizing plate may further comprise two or more wire grid patterns having different areas.

According to an aspect of the present invention, there is provided a method of fabricating a display device, the method comprises forming a metal layer on a light-transmitting substrate, forming a guide pattern layer on the metal layer, the guide pattern layer comprising guide barrier ribs and trenches disposed between the guide barrier ribs, where the trenches expose the metal layer. The method also includes forming a nanostructure in the trenches, the nanostructure formed of a self-aligned block copolymer, the nanostructure comprising first domains and second domains having a different etch rate from the first domains. The method also includes forming wire grid patterns by patterning the metal layer comprising target patterns using the first domains or the second domains as a mask. The target patterns comprise conductive structures shaped as closed curves, at least of the conductive structures surrounding another one of the conductive structures with a gap therebetween.

The target patterns may comprises two or more of the conductive structures, each comprising two first wire structures extending in a first direction and two or more second wire structures extending in a second direction different from the first direction.

The method may include placing an opaque layer on the wire grid patterns, the opaque layer covering the second wire structures.

The forming a guide pattern layer may further comprise reducing widths of the guide barrier ribs.

The forming wire grid patterns may further comprise forming third wire structures between the target patterns.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
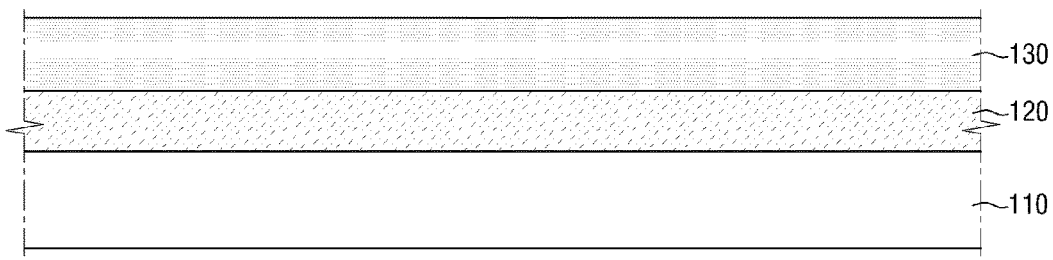
FIGS. 1, 2, 3, 4, 5, 6, 7, 8, 9, and 10 are schematic cross-sectional views illustrating a method of fabricating a wire grid polarizing plate according to a first embodiment of the present invention.

Features of the inventive concept and methods of accomplishing the same may be understood more readily with reference to the following detailed description of exemplary embodiments and the accompanying drawings. The inventive concept may be embodied in many different forms and should not be construed as being limited to the embodiments set forth herein. Rather, these embodiments are provided so that this disclosure sufficiently conveys the inventive concept to one of ordinary skill in the relevant art.

In the drawings, the thicknesses of layers and regions may be exaggerated for clarity. The various Figures are thus not to scale. It will be understood that when an element or layer is referred to as being "on," "connected to" or "coupled to" another element or layer, the element or layer can be directly on, connected or coupled to another element or layer, or with one or more intervening elements or layers being present. In contrast, when an element is referred to as being "directly on," "directly connected to" or "directly coupled to" another element or layer, there are no intervening elements or layers present. As used herein, connected may refer to elements being physically, electrically, operably, and/or fluidly connected to each other. All numerical values are approximate, and may vary. All examples of specific materials and compositions are to be taken as nonlimiting and exemplary only. Other suitable materials and compositions may be used instead.

Like numbers refer to like elements throughout. As used herein, the term "and/or" includes any and all combinations of one or more of the associated listed items.

It will be understood that, although the terms "first," "second," "third," etc. may be used herein to describe various elements, components, regions, layers and/or sections, the elements, components, regions, layers and/or sections should not be limited by those terms. Instead, those terms are merely used to distinguish one element, component, region, layer or section from another element, component, region, layer or section. Thus, a first element, component, region, layer or section described below could be easily termed a second element, component, region, layer or section without departing from the teachings of the present disclosure.

Spatially relative terms, such as "below," "lower," "under," "above," "upper" and the like, may be used herein to describe the spatial relationship of one element or feature to another element(s) or feature(s) as illustrated in the figures. It will be understood that the spatially relative terms are intended to encompass different orientations of the device during use or operation, in addition to the orientation depicted in the figures. For example, if the device in the figures is turned over, elements described as "below" or "beneath" relative to other elements or features would then be oriented "above" relative to the other elements or features. Thus, the example term "below" can encompass both an orientation of above and below, depending on the orientation of the elements. The device may be otherwise oriented (rotated 90 degrees or at other orientations) and the spatially relative descriptors used herein interpreted accordingly.

The terminology used herein is for the purpose of describing certain embodiments and is not intended to limit the inventive concept. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list. Further, the use of "may" when describing embodiments refers to "one or more embodiments." Also, the term "example" is intended to refer to an example or illustration. As used herein, the terms "use," "using," and "used" may be considered synonymous with the terms "utilize," "utilizing," and "utilized," respectively.

The present invention will now be described more fully with reference to the accompanying drawings, in which exemplary embodiments of the invention are shown.

FIGS. 1 through 10 are schematic cross-sectional views illustrating a method of fabricating a wire grid polarizing plate according to a first embodiment of the present invention.

Referring to FIG. 1, a base substrate may include a light-transmitting substrate 110, a conductive layer 120, and a guide layer 130.

The light-transmitting substrate 110 can be made of any material capable of transmitting visible light. The material that forms the light-transmitting substrate 110 may be selected according to the purpose of use or a process. For example, the light-transmitting substrate 110 may be made of various polymer compounds such as, but not limited to, glass, quartz, acrylic, triacetylcellulose (TAC), cyclic olefin copolymer (COC), cyclic olefin polymer (COP), polycarbonate (PC), polyethylene terephthalate (PET), polyimide (PI), polyethylene naphthalate (PEN), polyether sulfone (PES), and polyarylate (PAR). The light-transmitting substrate 110 may also be made of an optical film having a certain degree of flexibility.

The conductive layer 120 may be formed on the light-transmitting substrate 110. The conductive layer 120 may cover substantially the entire surface of the light-transmitting substrate 110. The conductive layer 120 can be made of any conductive material. For example, the conductive layer 120 may be made of metal, specifically, one of, but not limited to, aluminum (Al), chrome (Cr), silver (Ag), copper (Cu), nickel (Ni), titanium (Ti), cobalt (Co), molybdenum (Mo), and any alloy of these metals.

In some cases, the conductive layer 120 may have a multilayer structure including two or more layers. For example, a first conductive layer (not illustrated) may be made of, but is not limited to, aluminum, and a second conductive layer (not illustrated) may be made of, but is not limited to, titanium or molybdenum. If the first conductive layer (not illustrated) is made of aluminum, hillocks may be formed depending on the temperature of a subsequent process. Accordingly, an upper surface of the first conductive layer may become uneven, thus degrading optical characteristics of the associated display device. To prevent this problem, the second conductive layer (not illustrated) made of titanium or molybdenum may be formed on the first conductive layer (not illustrated). The second conductive layer can prevent hillock formation.

The conductive layer 120 can be formed using, as a nonlimiting example, a sputtering method, a chemical vapor deposition (CVD) method, or an evaporation method.

The guide layer 130 may be formed on the conductive layer 120. For example, the guide layer 130 may be, but is not limited to, a photoresist layer. The guide layer 130 may cover substantially the entire surface of the conductive layer 120.

Figure 2:
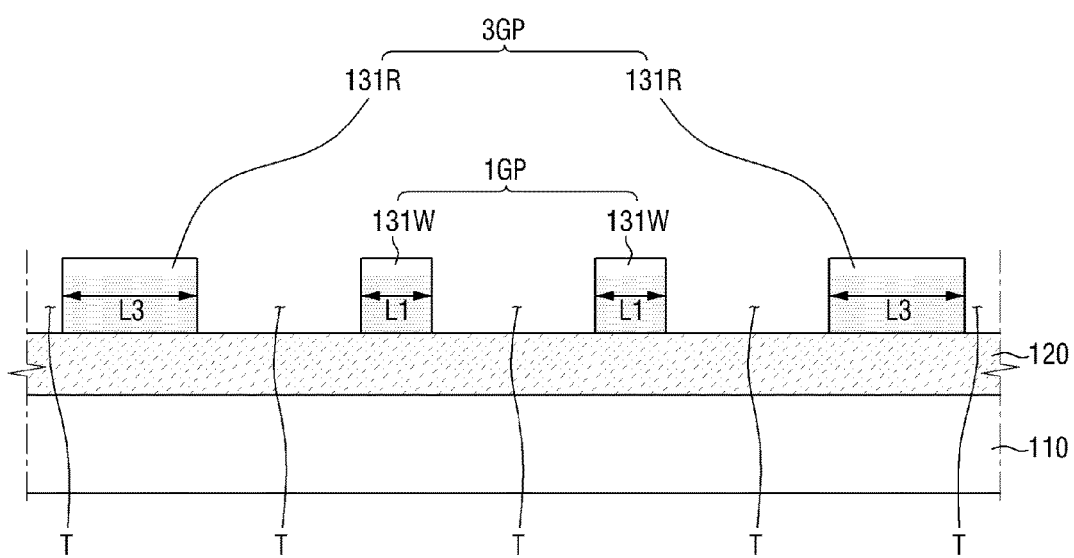

A process of forming a first guide pattern layer (1GP, 3GP, T) by patterning the guide layer 130 will now be described in detail with reference to FIG. 2. Referring to FIG. 2, the first guide pattern layer (1GP, 3GP, T) may include first and third guide patterns 1GP and 3GP and first trenches T. If the guide layer 130 is formed as a photoresist layer, first guide barrier ribs 131W and third guide barrier ribs 131R may be formed by exposing and developing (that is, patterning) the guide layer 130 using a mask. However, the present invention is not limited thereto, and various patterning techniques can be used.

The first guide pattern 1GP may include the first guide barrier ribs 131W, which are separated or spaced apart from each other. The third guide pattern 3GP may include the third guide barrier ribs 131R, which are also separated or spaced apart from each other. The first trenches T may be formed between the first guide barrier ribs 131W, between the third barrier ribs 131R, and between the first and third guide barrier ribs 131W and 131R to partially expose the conductive layer 120. That is, all adjacent ribs 131W, 131R are separated from each other by a trench T.

Each of the first guide barrier ribs 131W may be formed to a first width L1, and each of the third guide barrier ribs 131R may be formed to a third width L3. The first width L1 may be smaller than the third width L3. In other words, the third width L3 of each of the third guide barrier ribs 131R is greater than the first width L1 of each of the first guide barrier ribs 131W.

Figure 3:
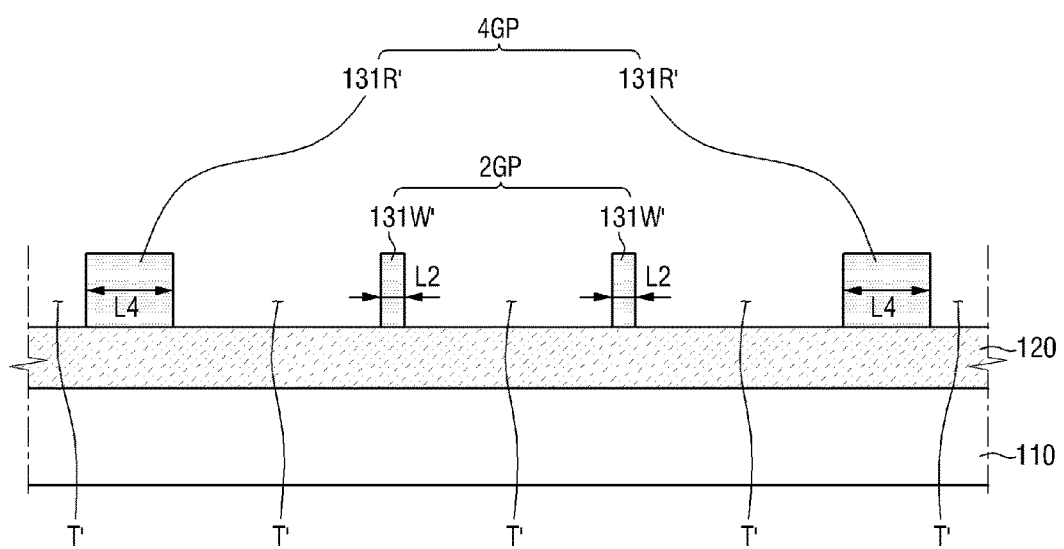

Referring to FIGS. 2 and 3, a trimming process for forming second and fourth guide patterns 2GP and 4GP by reducing the first and third widths L1 and L3 of the first and third guide patterns 1GP and 3GP may be performed. The trimming process may turn the first guide pattern layer (1GP, 3GP, T) into a second guide pattern layer (2GP, 4GP, T'). The first guide barrier ribs 131W may become second guide barrier ribs 131W', the third guide barrier ribs 131R may become fourth guide barrier ribs 131R', and the first trenches T may become second trenches T'.

The trimming process may reduce the first width L1 of each of the first guide barrier ribs 131W to a second width L2 of each of the second guide barrier ribs 131W', reduce the third width L3 of each of the third guide barrier ribs 131R to a fourth width L4 of each of the fourth guide barrier ribs 131R', and increase a width of each of the first trenches T to a width of each of the second trenches T'. In some cases, the second width L2 of each of the second guide barrier ribs 131W' may be reduced by the trimming process even to a width close to or substantially equal to a width of each domain 141 or 142 (see FIG. 5) of a self-aligned block copolymer nanostructure which will be described later.

As the first and third widths L1 and L3 of the first and third guide barrier ribs 131W and 131R are reduced, the aperture ratio and transmittance of the wire grid polarizing plate may increase. Specifically, as the first and third widths L1 and L3 of the first and third guide barrier ribs 131W and 131R are reduced, the number of the domains 141 and 142 (see FIG. 5) of the self-assembled block copolymer nanostructure which will be formed in each second trench T' between the second and fourth guide barriers 131W' and 131R' may increase, thereby increasing the aperture ratio of the wire grid polarizing plate. The domains 141 and 142 of the self-assembled block copolymer nanostructure will be described later with reference to FIG. 5.

As one example, the trimming process may be performed using a plasma etching process. In the trimming process, any plasma can be used as long as it can reduce the first and third widths L1 and L3 of the first and third guide barrier ribs 131W and 131R. In a nonrestrictive example, oxygen plasma may be used in the trimming process.

The second guide pattern 2GP may serve as a mask for forming third wire structures 3WS (see FIG. 13) of wire grid patterns, which will be described later. The fourth guide pattern 4GP may serve as a mask for forming reflective patterns RF (see FIG. 13), which will be described later.

The second guide pattern 2GP may include the second guide barrier ribs 131W' separated or spaced apart from each other, and the fourth guide pattern 4GP may include the fourth guide barrier ribs 131R' separated or spaced apart from each other.

Figure 4:
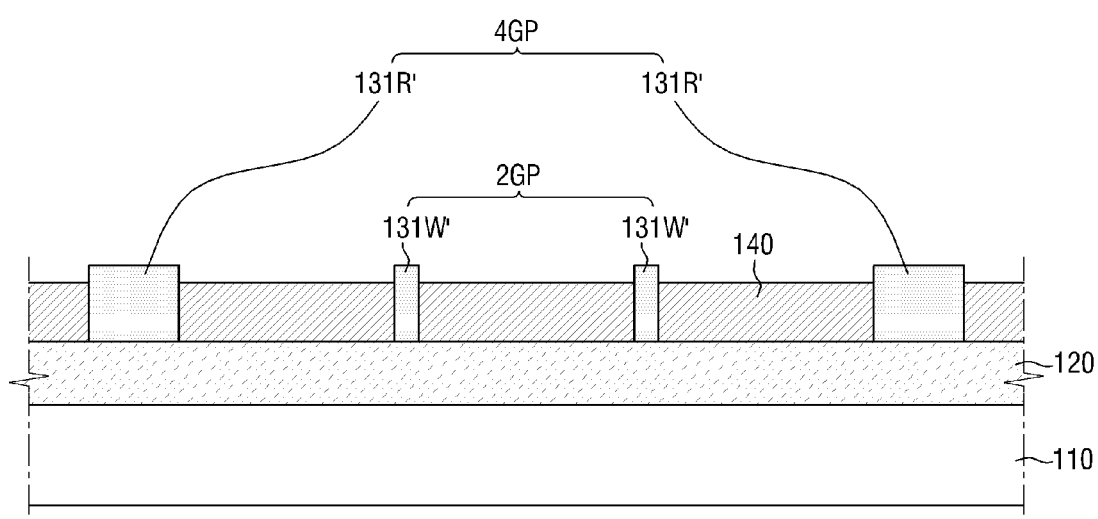

Referring to FIGS. 3 and 4, a block copolymer layer 140 may be formed in each second trench T' between the second and fourth guide barrier ribs 131W' and 131R'. A block copolymer may include a first repeating unit and a second repeating unit. For example, the block copolymer may be polystyrene-b-polybutadiene (PS-b-PB), polystyrene-b-polyisoprene (PS-b-PI), polystyrene-b-poly(methyl methacrylate) (PS-b-PMMA), polystyrene-b-poly(2-vinylpyridine) (PS-b-P2VP), polystyrene-b-poly(ferrocenyl-dimethylsilane) (PS-b-PFDMS), polystyrene-b-poly(tert-butylacrylate) (PS-b-PtBA), polystyrene-b-poly(ferrocenylethylmethylsilane) (PS-b-PFEMS), polyisoprene-b-poly(ethyleneoxide) (PI-b-PEO), polybutadiene-b-poly(butadiene-b-vinylpyridinium) (PB-b-PVP), poly(tert-butylacrylate)-b-poly(cinnamoyl-ethylmethacrylate) (PtBA-b-PCEMA), polystyrene-b-polyactide (PS-b-PLA), poly(α-methylstyrene)-b-poly(4-hydroxystyrene) (PaMS-b-PHS), pentadecyl phenol modified polystyrene-b-poly(4-vinylpyridine) (PPDPS-b-P4VP), poly(styrene-b-ethyleneoxide) (PS-b-PEO), polystyrene-b-poly(dimethyl siloxane) (PS-b-PDMS), polystyrene-b-polyethylene (PS-b-PE), polystyrene-b-poly(ferrocenyl dimethyl silane) (PS-b-PFS), polystyrene-b-poly(paraphenylene) (PS-b-PPP), PS-b-PB-b-PS, PS-b-PI-b-PS, poly(propyleneoxide)-b-PEO (PPO-b-PEO), poly(4-vinyl-phenyldimethyl-2-propoxysilane) (PVPDMPS)-b-PI-b-PVPDMPS, PS-b-P2VP-b-PtBMA, or a block copolymer thereof.

The first repeating unit and the second repeating unit have different chemical properties. The first repeating unit and the second repeating unit may be microphase-separated by self-assembly. The first repeating unit and the second repeating unit may have different etch rates. One of the first and second repeating units may have selective affinity for the second and fourth guide barrier ribs 131W' and 131R'. As will be described later, first domains having the first repeating unit self-aligned, or second domains having the second repeating unit self-aligned, may be removed.

Although not illustrated in the drawings, before the formation of the block copolymer layer 140 in the second trenches T', a neutral layer (not illustrated) may be formed on bottom portions of the second trenches T', that is, on the conductive layer 120 in the second trenches T'. The neutral layer (not illustrated) may be made of a material having a surface energy substantially similar to that of the block copolymer. The neutral layer (not illustrated) does not have selective affinity for the first repeating unit or the second repeating unit of the block copolymer. Therefore, the neutral layer can control the vertical alignment of the first repeating unit and the second repeating unit.

As an example, the neutral layer (not illustrated) may be, but is not limited to, a random copolymer layer of monomers of the block copolymer.

Examples of the random copolymer may include, but are not limited to, polystyrene-r-polybutadiene (PS-r-PB), polystyrene-r-polyisoprene (PS-r-PI), polystyrene-r-poly(methyl methacrylate) (PS-r-PMMA), polystyrene-r-poly(2-vinylpyridine) (PS-r-P2VP), polystyrene-r-poly(ferrocenyl-dimethylsilane) (PS-r-PFDMS), polystyrene-r-poly(tert-butylacrylate) (PS-r-PtBA), polystyrene-r-poly(ferrocenylethylmethylsilane) (PS-r-PFEMS), polyisoprene-r-poly(ethyleneoxide) (PI-r-PEO), polybutadiene-r-poly(butadiene-r-vinylpyridinium) (PB-r-PVP), poly(tert-butylacrylate)-r-poly(cinnamoyl-ethylmethacrylate) (PtBA-r-PCEMA), polystyrene-r-polyactide (PS-r-PLA), poly(α-methylstyrene)-r-poly(4-hydroxystyrene) (PaMS-r-PHS), pentadecyl phenol modified polystyrene-r-poly(4-vinylpyridine) (PPDPS-r-P4VP), poly(styrene-r-ethyleneoxide) (PS-r-PEO), polystyrene-r-poly(dimethyl siloxane) (PS-r-PDMS), polystyrene-r-polyethylene (PS-r-PE), polystyrene-r-poly(ferrocenyl dimethyl silane) (PS-r-PFS), polystyrene-r-poly(paraphenylene) (PS-r-PPP), PS-r-PB-r-PS, PS-r-PI-r-PS, poly(propyleneoxide))-r-PEO (PPO-r-PEO), poly(4-vinyl-phenyldimethyl-2-propoxysilane) (PVPDMPS)-r-PI-r-PVPDMPS, and PS-r-P2VP-r-PtBMA.

In addition, surfaces of the second and fourth guide barrier ribs 131W' and 131R' may be processed to become hydrophobic. For example, the surfaces of the second and fourth guide barrier ribs 131W' and 131R' may be processed to become hydrophobic by, as nonlimiting examples, a fluorine-based polymer coating process or a fluorine-based gas plasma treatment process. Furthermore, the surfaces of the second and fourth guide barrier ribs 131W' and 131R' may be processed before the formation of the neutral layer (not illustrated).

Figure 5:
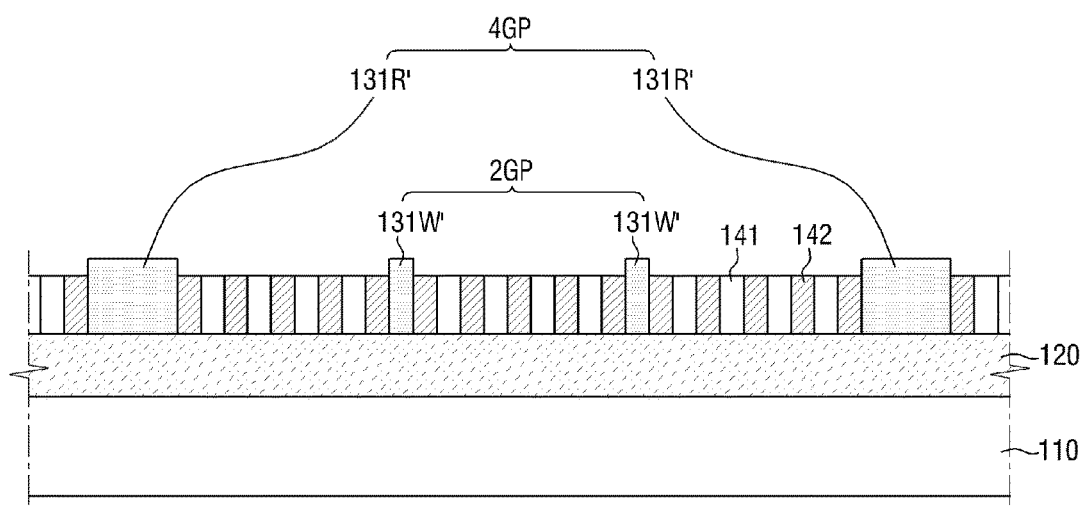

Referring to FIGS. 4 and 5, the block copolymer layer 140 may be self-assembled into a self-assembled block copolymer nanostructure having alternating first domains 141 and second domains 142.

The self-assembled block copolymer nanostructure may include the first domains 141 and the second domains 142. The first domains 141 may consist of first repeating units, and the second domains 142 may consist of second repeating units. The first domains 141 may be formed by the self-assembly of the first repeating units, and the second domains 142 may be formed by the self-assembly of the second repeating units.

The self-assembly of the block copolymer 140 may be achieved by, for example, an annealing process. The annealing process may be a thermal annealing process or a solvent annealing process. The thermal annealing process induces microphase separation by heating a block copolymer to the block copolymer's glass transition temperature (Tg) or higher. The solvent annealing process induces microphase separation by exposing a block copolymer to solvent vapor.

For example, to perform the solvent annealing process, heights of the first and third guide barrier ribs 131W and 131R (see FIG. 2) after the trimming process should be 2.5 times greater than a height of the block copolymer layer 140.

In the solvent annealing process, swelling occurs as an evaporated solvent permeates into the block copolymer. Therefore, only when the second and fourth guide barriers 131W' and 131R' (see FIG. 3) have the above heights can the block copolymer be prevented from flowing out of the second trenches T' (see FIG. 3) beyond the second and fourth guide barriers 131W' and 131R' (see FIG. 3).

Figure 6:
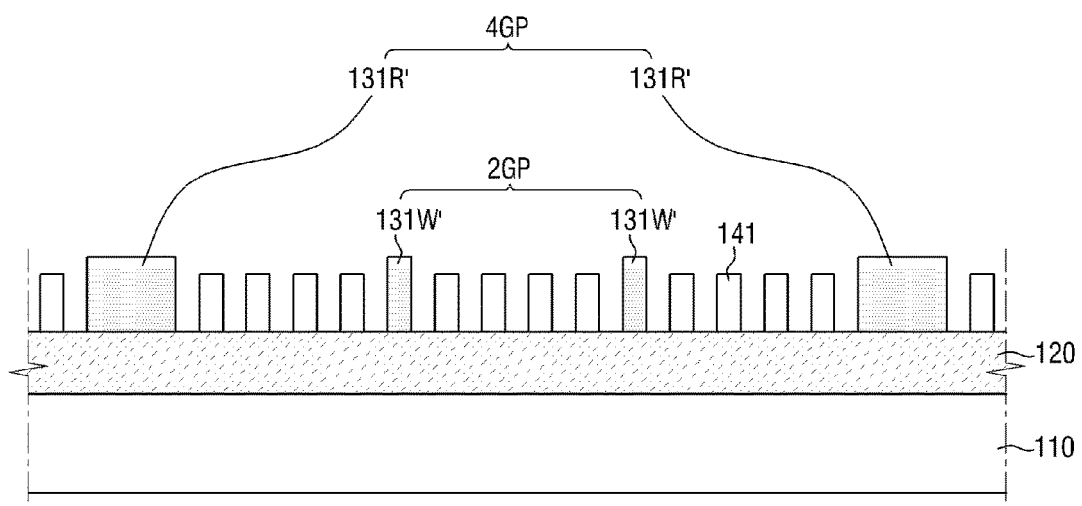

Referring to FIGS. 5 and 6, of the first domains 141 and the second domains 142, only the second domains 142 may be removed. For example, the process of removing only the second domains 142 and not the first domains 141 may use a solvent having high affinity for the second domains 142. However, the present invention is not limited thereto, and the second domains 142 can also be removed by a dry-etching process. A gas that can be used in the dry-etching process may be one or more of, but is not limited to, oxygen ($O_2$), a carbon fluoride gas, and hydrogen fluoride (HF). The carbon fluoride gas may be one or more of, but is not limited to, $C_4F_8$, $CHF_3$, $CH_2F_2$, $C_4F_8$, $CF_4$, and $C_2F_6$.

Referring to FIGS. 6 through 10, a conductive pattern layer may be formed by patterning the conductive layer 120 using the second and fourth guide barrier ribs 131W' and 131R' and the first domains 141 as a mask. The conductive pattern layer may include wire grid patterns PT and reflective patterns RF.

The wire grid patterns PT may include conductive barrier ribs 121D and 121W arranged at intervals of a period shorter than a wavelength of incident light. The wire grid patterns PT may transmit first polarized light and reflect second polarized light perpendicular to the first polarized light. The first polarized light is P-wave polarized light polarized perpendicular to the conductive barrier ribs 121D and 121W, and the second polarized light is S-wave polarized light polarized parallel to the conductive barrier ribs 121W and 121D.

In a nonrestrictive example, the conductive barrier ribs 121W and 121D may have a line width of approximately 50 nm or less, a thickness of approximately 150 nm or more, and may be arranged with a pitch of approximately 100 nm.

The conductive barrier ribs 121D may be formed by patterning the conductive layer 120 in regions protected by the first domains 141, and the conductive barrier ribs 121W may be formed by patterning the conductive layer 120 in regions protected by the second guide barrier ribs 131W'. The reflective patterns RF may be formed by patterning the conductive layer 120 in regions protected by the fourth guide barrier ribs 131R'. The reflective patterns RF may reflect both the first polarized light and the second polarized light. The second polarized light reflected by the wire grid patterns PT may be reflected again by the reflective patterns RF to enter the wire grid patterns PT. The reflective patterns RF may be placed between the wire grid patterns PT, as will be described further below. In particular, this will be described in more detail with reference to FIGS. 11 through 13.

Figure 7:
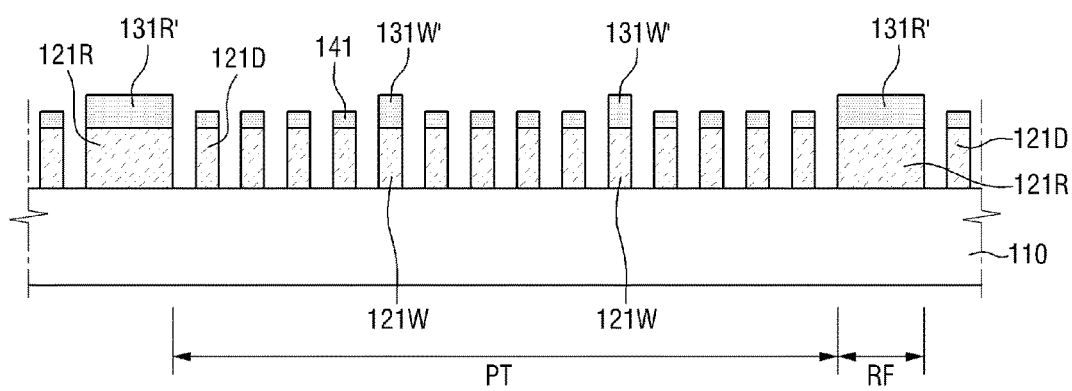

A wire grid polarizing plate of FIG. 7 may include a light-transmitting substrate 110, a plurality of parallel conductive barrier ribs 121D, 121W and 121R which protrude upward from the light-transmitting substrate 110, second and fourth guide barrier ribs 131W' and 131R' which are located on the conductive barrier ribs 121W and 121R, and first domains 141 which are located on the conductive barrier ribs 121D.

In an etching process, the second and fourth guide barrier ribs 131W' and 131R' and the first domains 141 may not be completely removed. Accordingly, the second and fourth guide barrier ribs 131W' and 131R' and the first domains 141 may remain on the conductive barrier ribs 121D, 121W and 121R.

The first domains 141 may be repeatedly placed adjacent to each other between the second guide barrier ribs 131W'. In addition, the first domains 141 may be repeatedly placed adjacent to each other between the second and fourth guide barrier ribs 131W' and 131R'. That is, multiple first domains 141 may be fabricated between adjacent barrier ribs 131W', and between adjacent ribs 131W' and 131R'.

Figure 8:
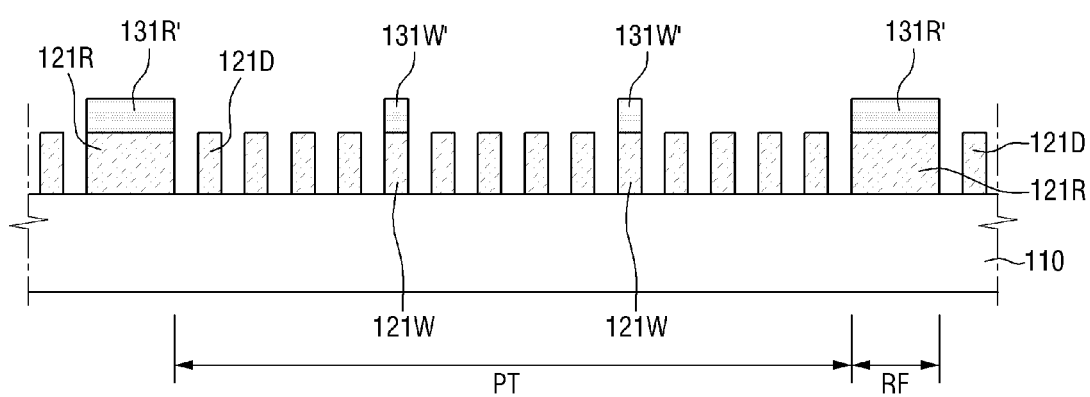

A wire grid polarizing plate of FIG. 8 may include a light-transmitting substrate 110, a plurality of parallel conductive barrier ribs 121D, 121W and 121R which protrude upward from the light-transmitting substrate 110, and second and fourth guide barrier ribs 131W' and 131R' which are located on the conductive barrier ribs 121W and 121R. The wire grid polarizing plate of FIG. 8 is different from the wire grid polarizing plate of FIG. 7 in that first domains 141 are not disposed on (i.e., are removed from) the conductive barrier ribs 121D.

The second and fourth guide barrier ribs 131W' and 131R' may be disposed with the conductive barrier ribs 121D interposed therebetween.

Figure 9:
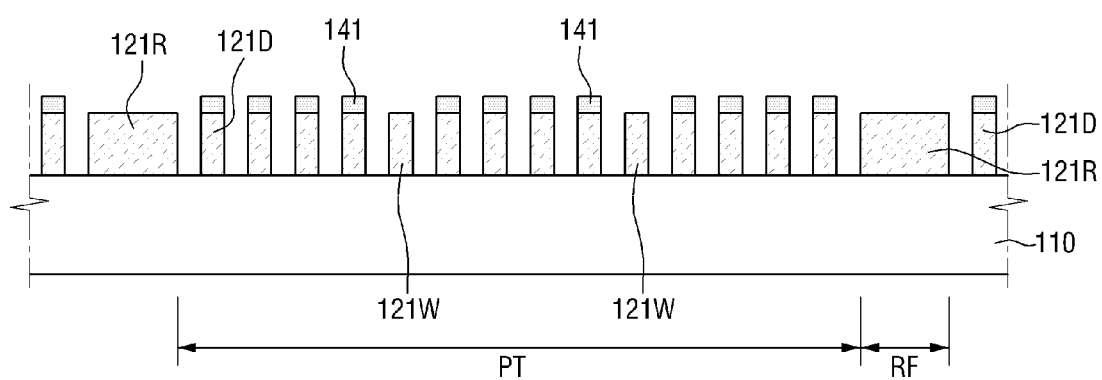

A wire grid polarizing plate of FIG. 9 may include a light-transmitting substrate 110, a plurality of parallel conductive barrier ribs 121D, 121W and 121R which protrude upward from the light-transmitting substrate 110, and first domains 141 which are located on the conductive barrier ribs 121D. The wire grid polarizing plate of FIG. 9 is different from the wire grid polarizing plate of FIG. 7 in that second and fourth guide barrier ribs 131W' and 131R' are not disposed on, i.e. have been removed from, the conductive barrier ribs 121W and 121R.

The first domains 141 may be arranged at predetermined intervals between the conductive barrier ribs 121W and 121R.

Figure 10:
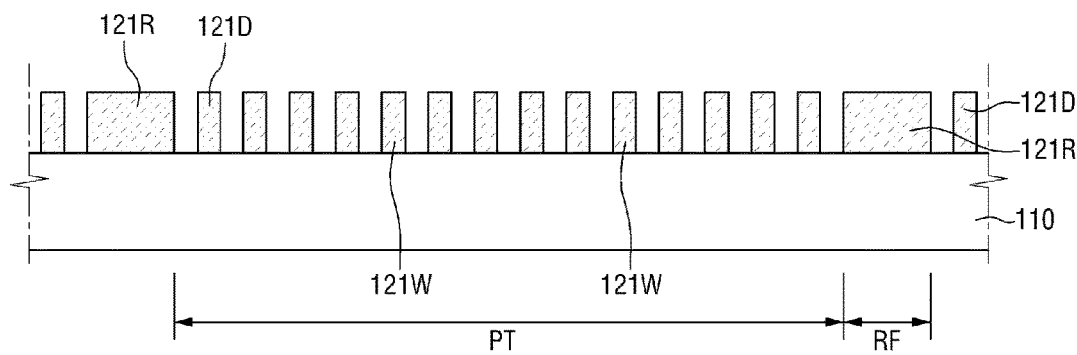

A wire grid polarizing plate of FIG. 10 may include a light-transmitting substrate 110 and a plurality of parallel conductive barrier ribs 121D, 121W and 121R which protrude upward from the light-transmitting substrate 110.

Second and fourth guide barrier ribs 131W' and 131R' may be removed from the conductive barrier ribs 121D, 121W and 121R, leaving only the conductive barrier ribs 121D, 121W and 121R on the light-transmitting substrate 110.

Figure 11:
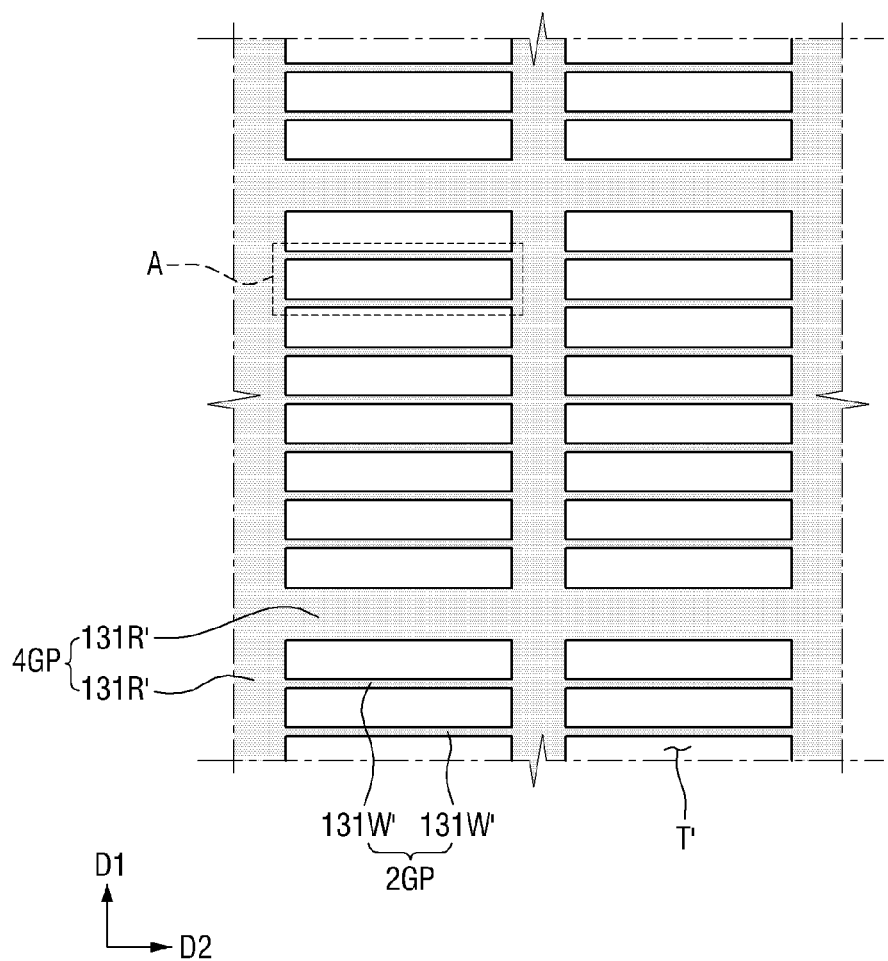
FIG. 11 is a schematic plan view of the resultant structure of FIG. 5.
Figure 12:
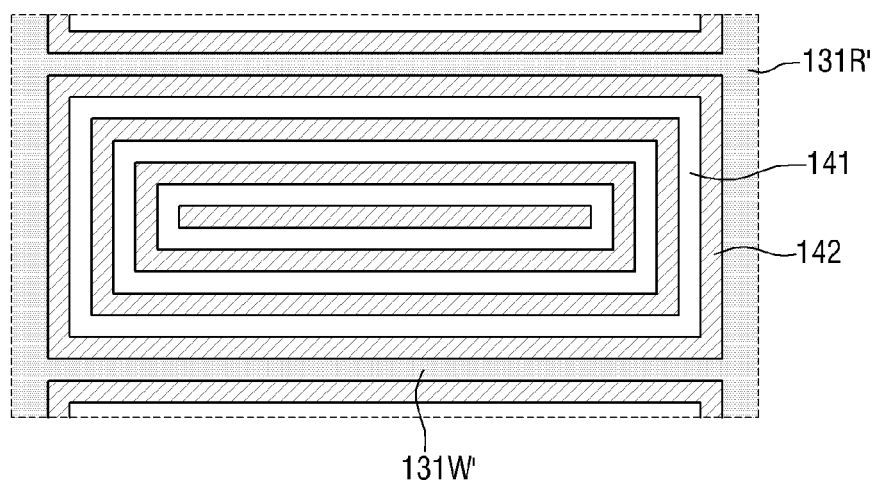
FIG. 12 is a schematic enlarged view of region 'A' of FIG. 11.

FIG. 11 is a schematic plan view of the structure of FIG. 5. FIG. 12 is a schematic enlarged view of region 'A' of FIG. 11.

Referring to FIG. 11, a plurality of second guide patterns 2GP, each including a number of the second guide barrier ribs 131W', may extend parallel to a second direction D2 and may be separated from each other. A plurality of fourth guide patterns 4GP, each including a number of the fourth guide barrier ribs 131R', may extend parallel to the first direction D1 and/or the second direction D2 to be separated from each other with groups of the second trenches T' interposed therebetween. The second guide patterns 2GP may be connected to the fourth guide patterns 4GP.

The second trenches T' may be formed in regions surrounded by the second and fourth guide patterns 2GP and 4GP and may be, for example, rectangular.

Referring to FIG. 12, a nanostructure of a self-aligned block copolymer may be formed in each of the second trenches T'. The nanostructure of the self-aligned block copolymer may include the first domains 141 and the second domains 142. The first domains 141 and the second domains 142 may form a first target pattern in each of the second trenches T'.

For example, as illustrated in FIG. 12, rectangular polymer structures making up the first domains 141 and rectangular polymer structures making up the second domains 142 are both shaped as closed curves, and may be alternately placed around each other to form the first target pattern in each of the second trenches T'. Each of the rectangular polymer structures of the second domains 142 may surround a corresponding smaller one of the rectangular polymer structures of the first domains 141, and each of the rectangular polymer structures of the first domains 141 may surround a corresponding smaller one of the rectangular polymer structures of the second domains 142. Accordingly, the first target pattern may be formed.

A linear first domain 141, a linear second domain 142, or the linear first domain 141 and the linear second domains 142 may be disposed inside an innermost rectangular polymer structure of the first target pattern. That is, some of the first domains 141 and some of the second domains 142 may not be rectangular in plan view, but may instead be any other shape.

Figure 13:
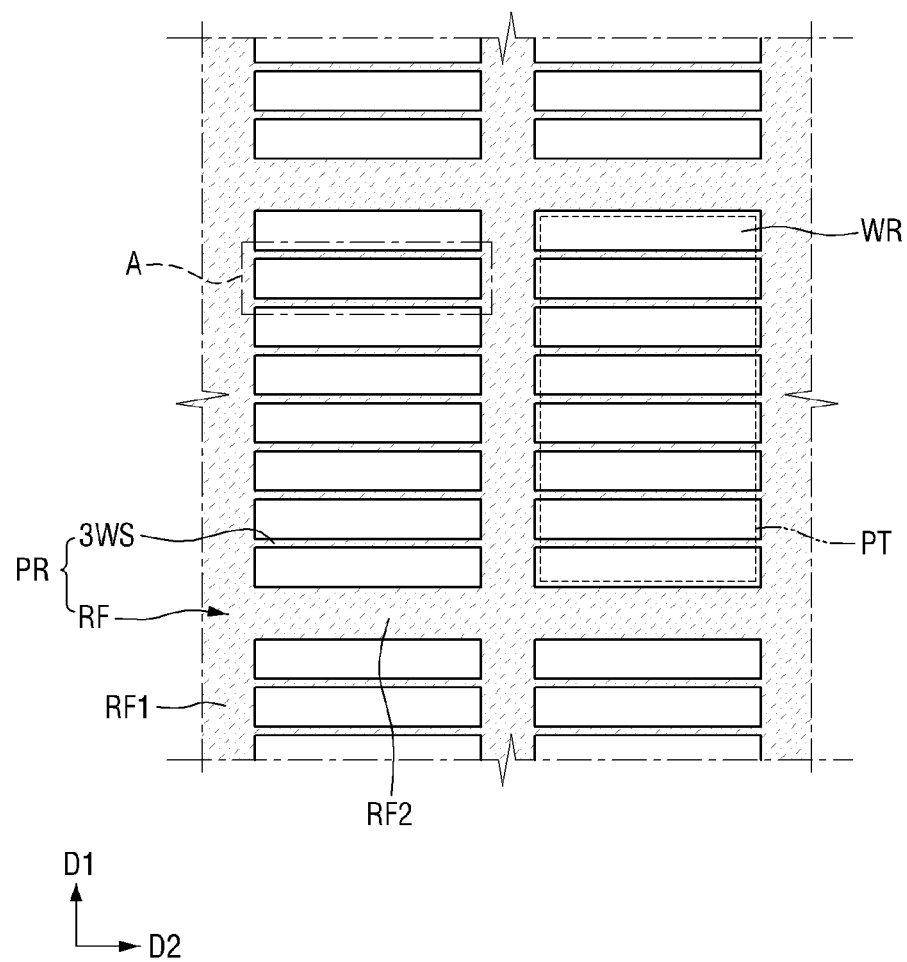
FIG. 13 is a schematic plan view of a wire grid polarizing plate of FIG. 10.
Figure 14:
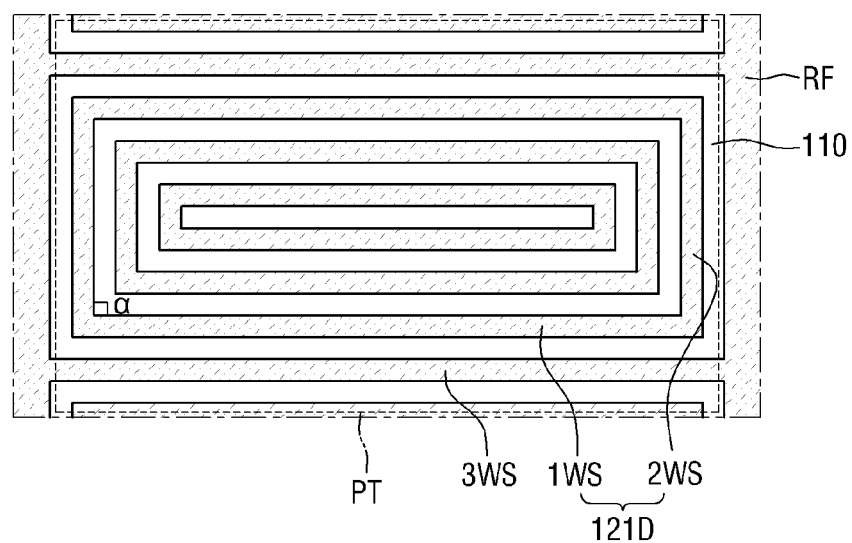
FIG. 14 is a schematic enlarged view of region 'A' of FIG. 13.

FIG. 13 is a schematic plan view of the wire grid polarizing plate of FIG. 10. FIG. 14 is a schematic enlarged view of region 'A' of FIG. 13. Referring to FIGS. 11 through 14, after the removal of the second domains 142 from each of the second trenches T', a second target pattern may be formed in each window region WR using the first domains 141 as a mask, third wire structures 3WS may be formed using the second guide barrier ribs 131W' as a mask, and reflective patterns RF may be formed using the fourth guide barrier ribs 131R' as a mask.

Referring to FIGS. 13 and 14, the wire grid polarizing plate may include the window regions WR and a frame region PR which surrounds the window regions WR. The window regions WR may respectively correspond to the second trenches T' (see FIG. 11), and the second target pattern may be formed in each of the window regions WR. The window regions WR may extend lengthwise along the second direction D2.

The second target pattern may include two or more polygonal conductive closed curve-shaped structures, each formed by connecting two parallel first wire structures 1WS with two or more second wire structures 2WS. Here, an angle α formed by the first and second wire structures 1WS and 2WS may be greater than zero degrees and smaller than 180 degrees (here, 90 degrees).

For example, the second target pattern may include two or more rectangular conductive structures, each formed by connecting two first wire structures 1WS which extend parallel to each other in the second direction D2 to two second wire structures 2WS which extend parallel to each other in the first direction D1 perpendicular to the second direction D2. Here, the angle α formed by the first and second wire structures 1WS and 2WS may be 90 degrees.

Each conductive structure formed by connecting the first and second wire structures 1WS and 2WS may be shaped like the first domains 141. Therefore, the shape of each conductive structure formed by connecting the first and second wire structures 1WS and 2WS may vary according to the shape of each of the first domains 141. For example, if each of the first domains 141 is shaped like a rectangular hexagon, each conductive structure formed by connecting the first and second wire structures 1WS and 2WS may also be shaped like a rectangular hexagon. In addition, if each of the first domains 141 is shaped like a rectangular octagon, each structure formed by connecting the first and second wire structures 1WS and 2WS may also be shaped like a rectangular octagon.

The frame region PR may include the third wire structures 3WS and the reflective patterns RF.

The third wire structures 3WS may be disposed between the window regions WR. Since the second target pattern is formed in each of the window regions WR, the third wire structures 3WS may be disposed between the second target patterns. The third wire structures 3WS may generally extend in the second direction D2 in which the first wire structures 1WS extend.

Each of the reflective patterns RF may include a straight first reflective region RF1 which extends parallel to the first direction D1, and a straight second reflective region RF2 which extends parallel to the second direction D2. Although not illustrated in the drawings, data wirings (not illustrated) may extend in a direction parallel to the first direction D1, and gate wirings (not illustrated) may extend in a direction parallel to the second direction D2. The first reflective regions RF1 may overlap the data wirings (not illustrated), and the second reflective regions RF2 may overlap the gate wirings (not illustrated).

The reflective patterns RF may be formed by patterning the conductive layer 120 in regions protected by the fourth guide patterns 4GP and may be connected to the third wire structures 3WS. The reflective patterns RF may be disposed between the wire grid patterns PT.

In addition, since each conductive structure formed by connecting the first and second wire structures 1WS and 2WS is shaped like the polymer structure of each of the first domains 141, the wire grid polarizing plate may further include fourth wire structures, each corresponding to the linear first domains 141 and/or the linear second domains 142. The fourth wire structures may extend in the same direction as the first wire structures 1WS.

Figure 15:
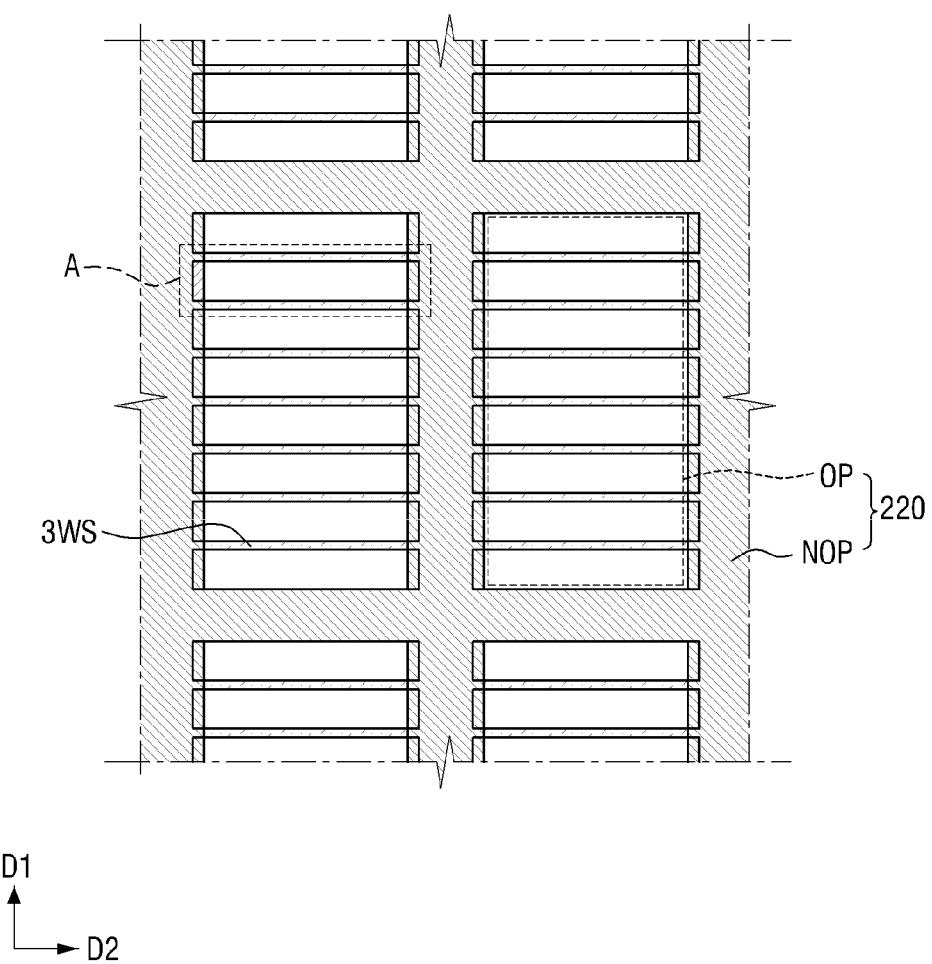
FIG. 15 is a schematic plan view illustrating the arrangement relationship between the wire grid polarizing plate of FIG. 13 and an opaque layer.
Figure 16:
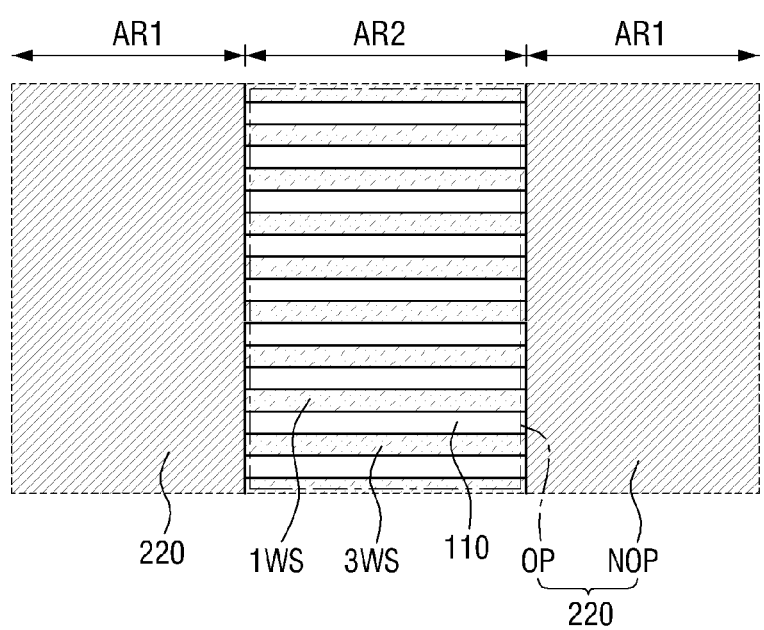
FIG. 16 is a schematic enlarged view of region 'A' of FIG. 15.

FIG. 15 is a schematic plan view of a display device for explaining the arrangement relationship between the wire grid polarizing plate of FIG. 13 and an opaque layer 220. FIG. 16 is a schematic enlarged view of region 'A' of FIG. 15.

Referring to FIGS. 13 through 16, the opaque layer 220 may be disposed on the wire grid polarizing plate and may include a non-opening portion NOP and opening portions OP. For example, the opaque layer 220 may be a black matrix.

A plurality of window regions WR and a plurality of third wire structures 3WS may be disposed in one opening portion OP.

The non-opening portion NOP may cover the second wire structures 2WS of the second target patterns, and the reflective patterns RF. Referring to FIG. 16, first areas AR1 of a second target pattern disposed in each of the window regions WR may be covered by the non-opening portion NOP, and a second area AR2 may overlap a corresponding opening portion OP. That is, the opaque layer 220 extends over the left and right sides of the opening portion OP of FIG. 13, forming a second area AR2 that is narrower than the opening portion OP of FIG. 13. The opaque layer 220 covers each of the second wire structures 2WS, exposing only the first and third wire structures 1WS and 3WS. Since the opaque layer 220 blocks incident light, first polarized light that transmits through the first areas AR1 covered by the non-opening portion NOP may not exit the display device. That is, the first areas AR1 block light, so that light may only pass through the second areas AR2 which are narrower than the opening portion OP prior to application of the opaque layer 220.

The first areas AR1 may include areas in which the second wire structures 2WS of the innermost conductive simple closed curve of the second target pattern are disposed. That is, the first areas AR1 extend into/over the opening portion OP at least far enough to cover each of the second wire structures 2WS. The second wire structures 2WS may thus be covered by the non-opening portion NOP. In some cases, the first wire structures 1WS connected to the second wire structures 2WS may be partially covered by the non-opening portion NOP.

The second area AR2 is an area in which the second wire structures 2WS are not disposed. The second area AR2 is disposed between the first areas AR1. The first wire structures 1WS are arranged in the second area AR2 at intervals of a period shorter than a wavelength of incident light, and extend parallel to the second direction D2.

In addition, the third wire structures 3WS may be separated from the first wire structures 1WS by the period shorter than the wavelength of incident light. The third wire structures 3WS may extend parallel to the second direction D2. The light-transmitting substrate 110 may be disposed between the first and third wire structures 1WS and 3WS in the area that overlaps each of the opening portions OP.

As described above, each of the reflective patterns RF may include the straight first reflective region RF1 (see FIG. 13) which is parallel to the first direction D1 and the straight second reflective region RF2 (see FIG. 13) which is parallel to the second direction D2. The non-opening portion NOP may include straight first opaque regions which cover the whole of the straight first reflective regions RF1 and straight second opaque regions which cover the whole of the straight second reflective regions RF2.

Although not illustrated in the drawings, data wirings may extend in a direction parallel to the first direction D1, and gate wirings may extend in a direction parallel to the second direction D2. The first opaque regions may overlap the gate wirings, and the second opaque regions may overlap the data wirings.

Figure 17:
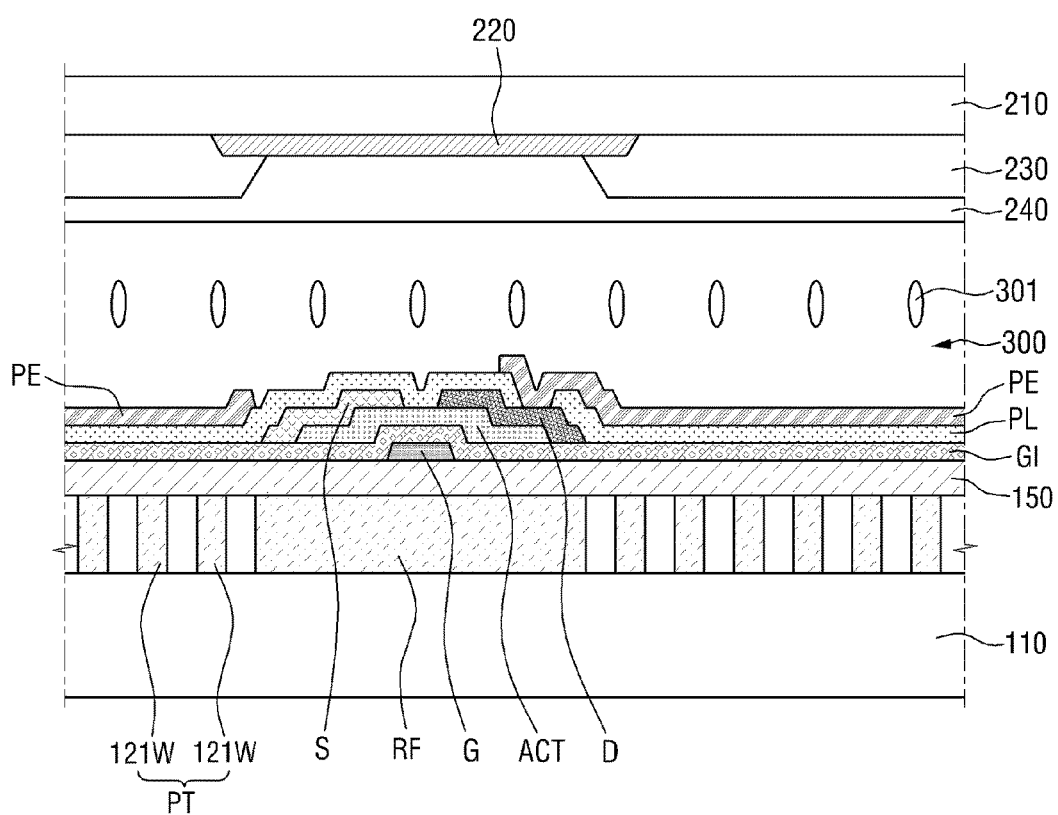
FIG. 17 is a schematic partial cross-sectional view illustrating the arrangement relationship between the wire grid polarizing plate of FIG. 10 and an opaque layer.

FIG. 17 is a schematic partial cross-sectional view of a display device for explaining the arrangement relationship between the wire grid polarizing plate of FIG. 10 and an opaque layer 220.

Referring to FIG. 17, the wire grid polarizing plate may be disposed on the light-transmitting substrate 110, a gate electrode G may be disposed on the wire grid polarizing plate, and an insulating layer 150 may be disposed between the wire grid polarizing plate and the gate electrode G. The wire grid polarizing plate may include the reflective patterns RF and the wire grid patterns PT. Each of the reflective patterns RF may be disposed in a region overlapped by the opaque layer 220. The wire grid patterns PT, each consisting of the conductive barrier ribs 121W, may be disposed in regions overlapped by color filters 230.

A thin-film transistor (TFT) may be configured as follows. The gate electrode G is located on the light-transmitting substrate 110, and a gate insulating layer GI is located on the gate electrode G. A semiconductor layer ACT is located on at least a region of the gate insulating layer GI which overlaps the gate electrode G, and a source electrode S and a drain electrode D are located on the semiconductor layer ACT to be separated from each other. A passivation layer PL is located on the gate insulating layer GI, the source electrode S, the semiconductor layer ACT, and the drain electrode D. A pixel electrode PE is located on the passivation layer PL and electrically connected to the drain electrode D via a contact hole which at least partially exposes the drain electrode D.

A liquid crystal layer 300 including liquid crystal molecules 301 may be disposed on the TFT, and a color filter substrate may be disposed on the liquid crystal layer 300. The color filter substrate may include a light-transmitting substrate 210 and the red, green and blue color filters 230 formed on the light-transmitting substrate 210. An overcoat layer 240 may be disposed on the opaque layer 220 and the color filters 230. The light-transmitting substrate 210 may be made of a transparent insulating material such as glass or plastic, and the opaque layer 220 may be a black matrix for preventing the leakage of light. The color filters 230 may be disposed at both ends of the opaque layer 220. Although not illustrated in the drawing, a common electrode (i.e., an electric field-generating electrode) made of a transparent conductive oxide, such as indium tin oxide (ITO) or indium zinc oxide (IZO), may further be formed on the overcoat layer 240.

The liquid crystal layer 300 rotates a polarization axis of incident light. The liquid crystal layer 300 may be, but is not limited to, a twisted nematic (TN) mode, a vertical alignment (VA) mode or a horizontal alignment (IPS, FFS) mode layer having positive dielectric anisotropy.

The display device may additionally include a backlight unit (not illustrated) which emits light and an upper polarizing plate (not illustrated) which is disposed on the light-transmitting substrate 210.

The backlight unit may further include, for example, a light guide plate (LGP), one or more light source units, a reflective member, an optical sheet, etc.

The LGP changes the path of light generated by the light source units toward the liquid crystal layer 300. The LGP may include an incident surface upon which light generated by the light source units is incident, and an exit surface which faces the liquid crystal layer 300. The LGP may be made of, but is not limited to, a material having light-transmitting properties such as polymethyl methacrylate (PMMA), or a material having a constant refractive index such as polycarbonate (PC).

Light incident upon one side or both sides of the LGP, which is made of the above materials, has an angle smaller than a critical angle of the LGP. Thus, the light is delivered into the LGP. When the light is incident upon an upper or lower surface of the LGP, an incidence angle of the light is greater than the critical angle. Thus, the light is evenly delivered within the LGP without exiting the LGP.

Scattering patterns may be formed on any one (e.g., the lower surface facing the exit surface) of the upper and lower surfaces of the LOP, such that light guided by the LGP can travel upward. To facilitate this, scattering patterns may be printed on one surface of the LGP using, e.g., ink, such that light delivered within the LOP can travel upward. The scattering patterns may be printed with ink. However, the present invention is not limited thereto, and fine grooves or protrusions can be formed on the LOP, as well as other modifications.

The reflective member may further be provided between the LOP and a bottom portion of a lower housing. The reflective member reflects light output from the lower surface (i.e., a surface opposite the exit surface of the LOP) of the LOP back to the LOP. The reflective member may be in the form of, but is not limited to, a reflective film.

The light source units may be placed to face the incident surface of the LGP. The number of the light source units can be changed as desired. For example, one light source unit may be placed on one side surface of the LOP, or three or more light source units may be placed to correspond to three or more side surfaces of the LOP. In addition, one or more light source units can be placed to correspond to any one of the side surfaces of the LGP. While the side-light type backlight unit, in which one or more light sources are placed on one or more side surfaces of the LGP, has been described above, a direct-type backlight unit, a surface light source type, etc. can also be used depending on the desired backlight configuration.

A white light-emitting diode (LED), which emits white light, may be provided as a light source. LEDs which emit red light, green light, and blue or other light, may also be provided as light sources. If a more than one light source is implemented as LEDs, which emit red light, green light, and blue light, respectively, it is possible to realize white light through color mixture by turning on the LEDs simultaneously.

Figure 18:
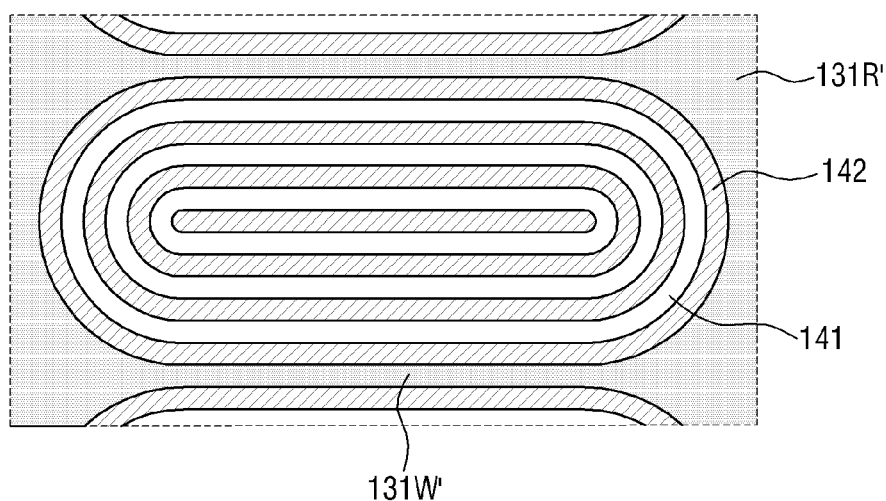
FIG. 18 is a modified example of FIG. 12.
Figure 19:
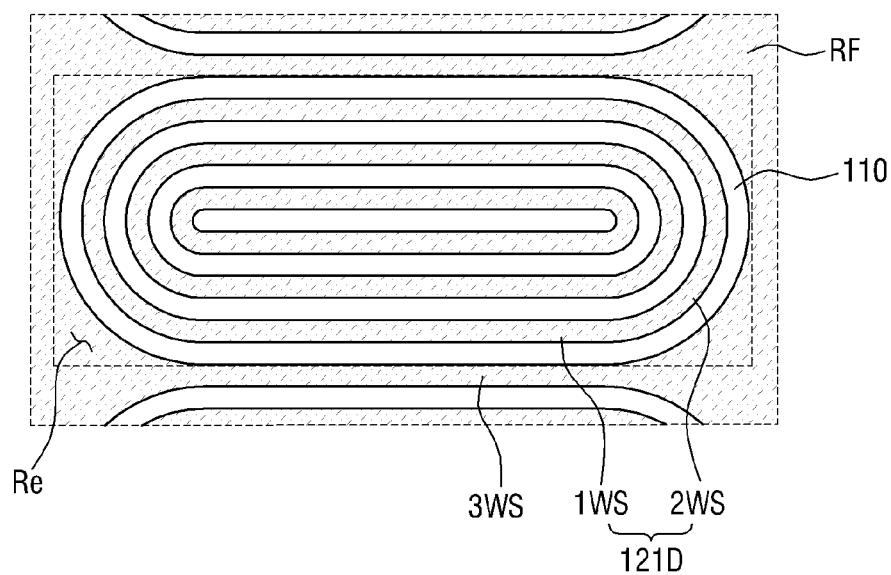
FIG. 19 is a modified example of the wire grid polarizing plate of FIG. 14.

FIG. 18 is a modified example of FIG. 12. FIG. 19 is a modified example of the wire grid polarizing plate of FIG. 14.

A second target pattern may include non-polygonal closed curves, each formed by connecting two first wire structures extending parallel to each other with two or more curvilinear second wire structures.

Referring to FIGS. 18 and 19, each of first and second target patterns may have a structure in which two or more structures shaped as closed curves are placed around each other with a gap therebetween, where each of the structures is formed by connecting two circular archlike or arcuate structures. Each of the first and second target patterns of FIGS. 18 and 19 includes two circular archlike or arcuate structures, whereas each of the first and second target patterns of FIGS. 12 and 14 is a rectangular structure. An archlike structure may include a curved portion and a support portion which supports the curved portion, and the support portion may be in the form of, e.g., straight lines.

The curvilinear structure described above is not limited to that formed by connecting two circular archlike structures and may be any structure formed by connecting, for example, two or more of a circular arch structure, a segment arch structure, a horseshoe arch structure, a pointed arch structure, and an ogee arch structure. Any nonlinear structures are contemplated.

Referring to FIG. 18, the first target pattern may have a structure in which first domains 141 formed as structures with both straight and curved parts, and second domains 142 also formed as structures with both straight and curved parts, are alternately placed around each other. The structures having both curved and linear parts may be similar to the previously-described rectangular structures of FIG. 12, but whose short sides have been modified so as to be curved rather than straight.

The second target pattern of FIG. 19 may include curved and straight structures like the structures of the first domains 141. Referring to FIG. 19, the second target pattern may include two or more conductive structures, each formed by connecting two parallel first wire structures 1WS and two curved second wire structures 2WS. The second target pattern of FIG. 19 includes curved second wire structures 2WS, whereas the second target pattern of FIG. 14 includes straight second wire structures 2WS.

The second target pattern of FIG. 19, having curved ends, can increase the area of each reflective pattern RF by a remaining area Re as compared to the rectangular second target pattern (indicated by a dotted line) of FIG. 14. The increased area of each reflective pattern RF can increase the efficiency of reflecting second polarized light. The remaining area Re is an area obtained by subtracting the area of the curved-ended second target pattern from the area of the rectangular second target pattern (indicated by the dotted line).

Figure 20:
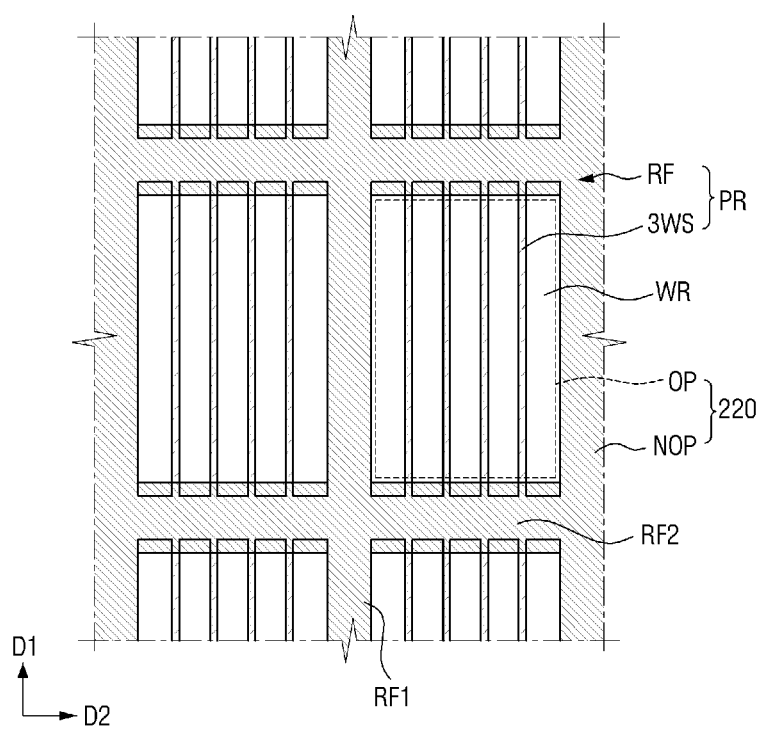
FIG. 20 is a schematic plan view illustrating the arrangement relationship between a first modified example of the wire grid polarizing plate of FIG. 13 and an opaque layer.

FIG. 20 is a schematic plan view illustrating the arrangement relationship between a first modified example of the wire grid polarizing plate of FIG. 13 and an opaque layer 220.

A wire grid polarizing plate of FIG. 20 may include window regions WR and a frame region PR disposed around the window regions WR.

The window regions WR and third wire structures 3WS extend parallel to the first direction D1 in the wire grid polarizing plate of FIG. 20, whereas the window regions WR and the third wire structures 3WS extend parallel to the second direction D2 in the wire grid polarizing plate of FIG. 13.

Since the frame region PR, reflective patterns RF and the opaque layer 220 have been described above, a detailed description thereof is omitted.

Figure 21:
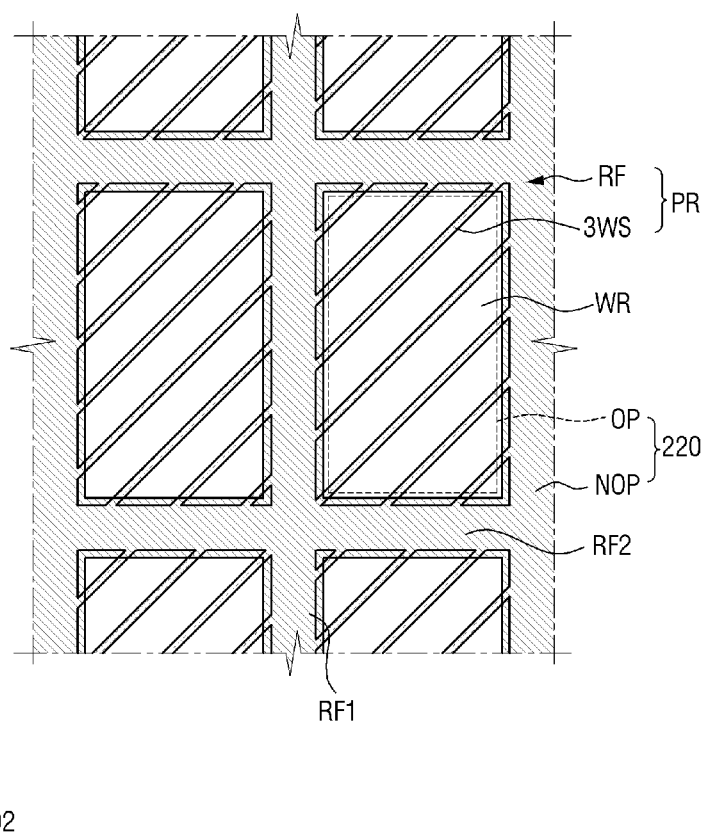
FIG. 21 is a schematic layout view illustrating the arrangement relationship between a second modified example of the wire grid polarizing plate of FIG. 13 and an opaque layer.

FIG. 21 is a schematic layout view illustrating the arrangement relationship between a second modified example of the wire grid polarizing plate of FIG. 13 and an opaque layer 220.

Window regions WR and third wire structures 3WS extend parallel to a third direction D3 in a wire grid polarizing plate of FIG. 21, whereas the window regions WR and the third wire structures 3WS extend parallel to the second direction D2 in the wire grid polarizing plate of FIG. 13. In addition, the wire grid polarizing plate of FIG. 21 includes two or more window regions WR having different shapes and areas, whereas the wire grid polarizing plate of FIG. 13 includes window regions WR each having the same shape and area.

Since a frame region PR, reflective patterns RF, and the opaque layer 220 have been described above, a detailed description thereof is omitted.

Figure 22:
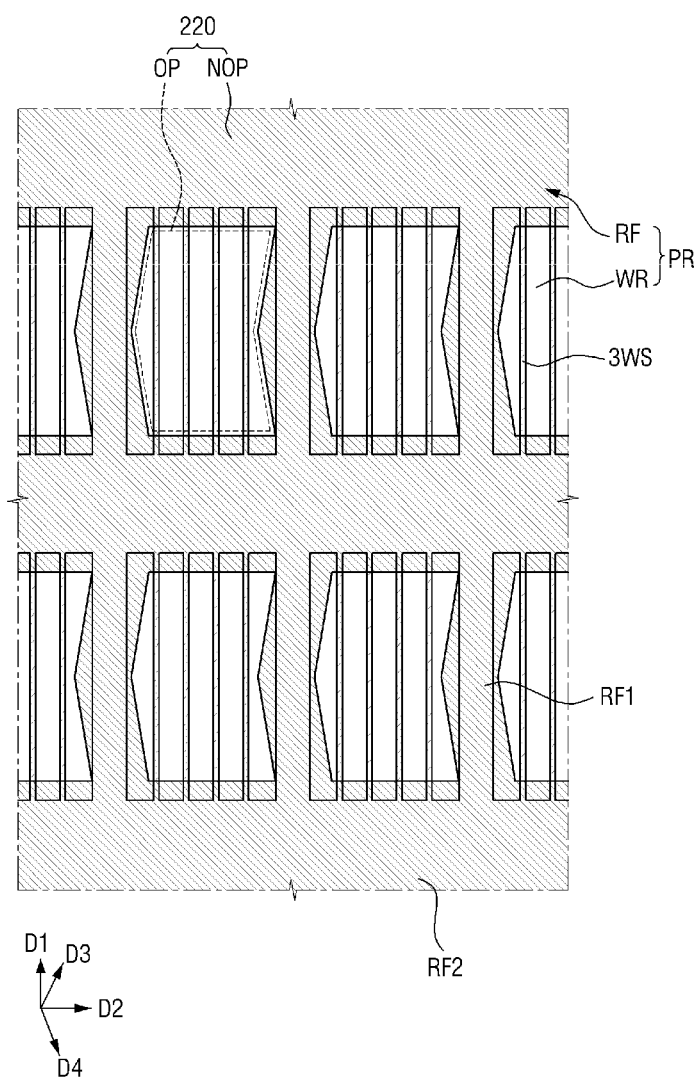
FIG. 22 is a schematic layout view illustrating the arrangement relationship between a third modified example of the wire grid polarizing plate of FIG. 13 and an opaque layer.

FIG. 22 is a schematic layout view illustrating the arrangement relationship between a third modified example of the wire grid polarizing plate of FIG. 13 and an opaque layer 220.

Window regions WR and third wire structures 3WS extend parallel to the first direction D1 in a wire grid polarizing plate of FIG. 22, whereas the window regions WR and the third wire structures 3WS extend parallel to the second direction D2 in the wire grid polarizing plate of FIG. 13.

The wire grid polarizing plate of FIG. 22 may include reflective patterns RF (see FIG. 13), each including a straight first reflective region RF1 (see FIG. 13) parallel to the first direction D1 and a straight second reflective region RF2 (see FIG. 13) parallel to the second direction D2.

The opaque layer 220 of FIG. 22 includes opening portions OP, each having a chevronlike shape formed by connecting two straight lines parallel to the second direction D2, two straight lines parallel to the third direction D3 and two straight lines parallel to a fourth direction D4, whereas the opaque layer 220 of FIG. 13 includes rectangular opening portions OP formed by connecting two straight lines parallel to the first direction D1 and two straight lines parallel to the second direction D2.

A non-opening portion NOP of FIG. 22 thus includes bent first opaque regions and straight second opaque regions, whereas the non-opening portion NOP of FIG. 15 includes straight first opaque regions and straight second opaque regions.

Each of the bent first opaque regions may be formed by connecting straight lines parallel to the third direction D3 and straight lines parallel to the fourth direction D4. The bent first opaque regions may overlap data wirings (not illustrated).

The first opaque regions may cover the whole of the data wirings. The first opaque regions may also cover the whole of the straight first reflective regions RF1. The straight second opaque regions may cover the second reflective regions RF2 extending parallel to the second direction D2. Although not illustrated in the drawing, gate wirings may extend parallel to the second direction D2, and the second opaque regions may overlap the gate wirings.

Figure 23:
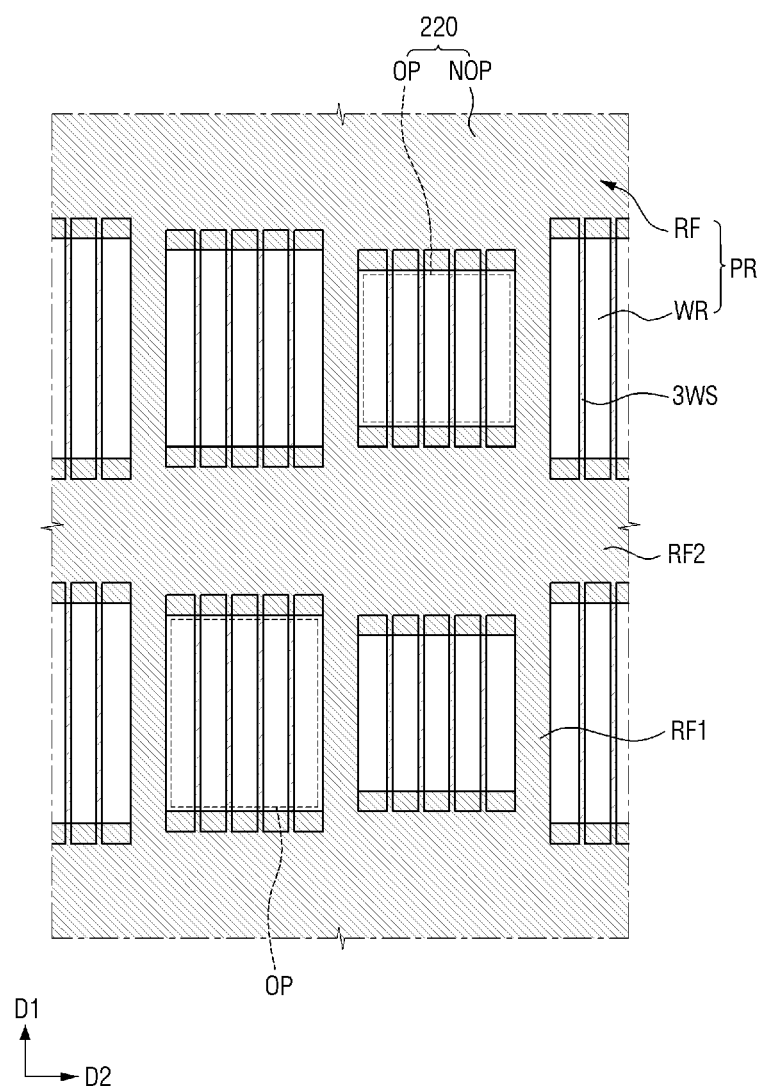
FIG. 23 is a schematic layout view illustrating the arrangement relationship between a fourth modified example of the wire grid polarizing plate of FIG. 13 and an opaque layer.

FIG. 23 is a schematic layout view illustrating the arrangement relationship between a fourth modified example of the wire grid polarizing plate of FIG. 13 and an opaque layer 220.

Window regions WR and third wire structures 3WS extend parallel to the first direction D1 in a wire grid polarizing plate of FIG. 23, whereas the window regions WR and the third wire structures 3WS extend parallel to the second direction D2 in the wire grid polarizing plate of FIG. 13. In addition, two or more window regions WR or two or more wire grid patterns PT (see FIG. 13) have different areas in the wire grid polarizing plate of FIG. 23, whereas the window regions WR or the wire grid patterns PT (see FIG. 13) have the same area in the wire grid polarizing plate of FIG. 13.

Each reflective pattern in the wire grid polarizing plate of FIG. 23 may include a straight first reflective region RF1 parallel to the first direction D1 and a straight second reflective region RF2 parallel to the second direction D2.

The opaque layer 220 of FIG. 23 includes two or more opening portions OP having different areas, whereas the opaque layer 220 of FIG. 13 includes opening portions OP each having the same area.

Figure 24:
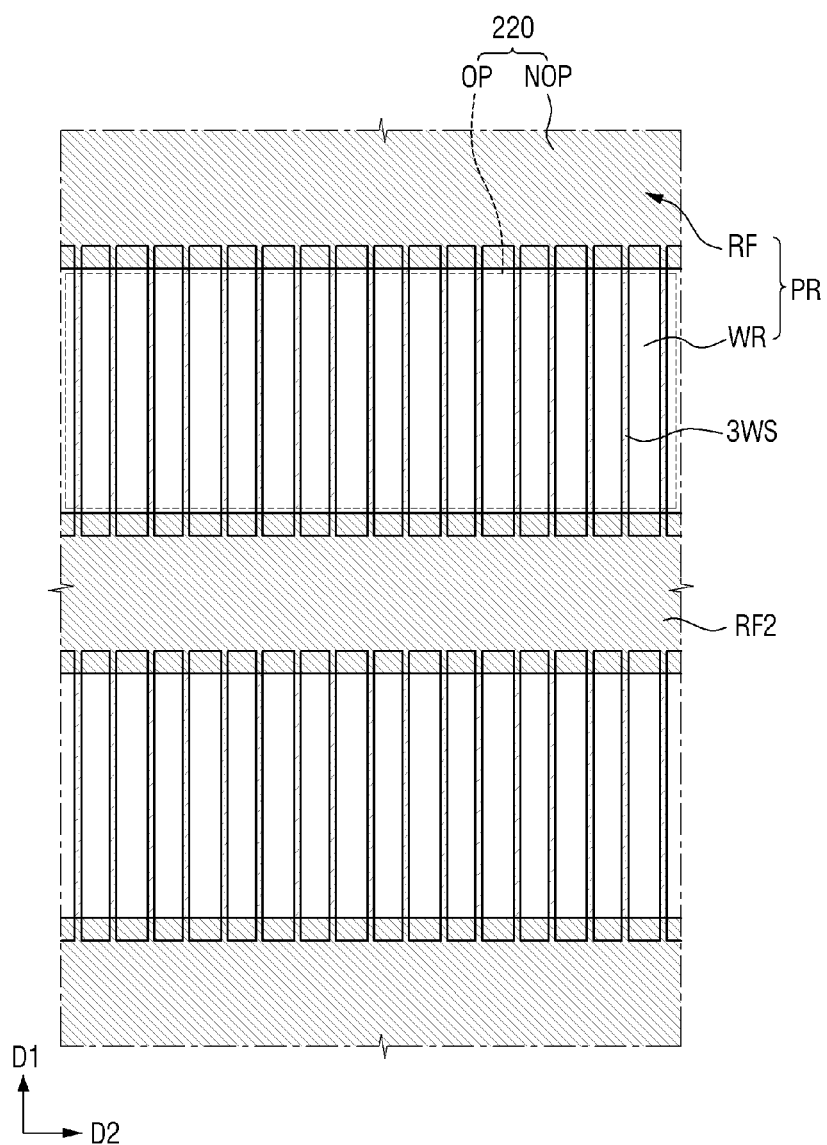
FIG. 24 is a schematic layout view illustrating the arrangement relationship between a fifth modified example of the wire grid polarizing plate of FIG. 13 and an opaque layer.

FIG. 24 is a schematic layout view illustrating the arrangement relationship between a fifth modified example of the wire grid polarizing plate of FIG. 13 and an opaque layer 220.

Window regions WR and third wire structures 3WS extend parallel to the first direction D1 in a wire grid polarizing plate of FIG. 24, whereas the window regions WR and the third wire structures 3WS extend parallel to the second direction D2 in the wire grid polarizing plate of FIG. 13.

The wire grid polarizing plate of FIG. 24 includes only straight second reflective regions RF2 parallel to the second direction D2 and does not include straight first reflective regions parallel to the first direction D1, whereas the wire grid polarizing plate of FIG. 13 includes both the first reflective regions RF1 and the second reflective regions RF2.

The opaque layer 220 of FIG. 24 includes only straight second opaque regions parallel to the second direction D2 and does not include straight first opaque regions parallel to the first direction D1, whereas the opaque layer 220 of FIG. 15 includes both the first opaque regions and the second opaque regions.

FIGS. 25 through 34 are schematic cross-sectional views illustrating a method of fabricating a wire grid polarizing plate according to a second embodiment of the present invention.

Figure 25:
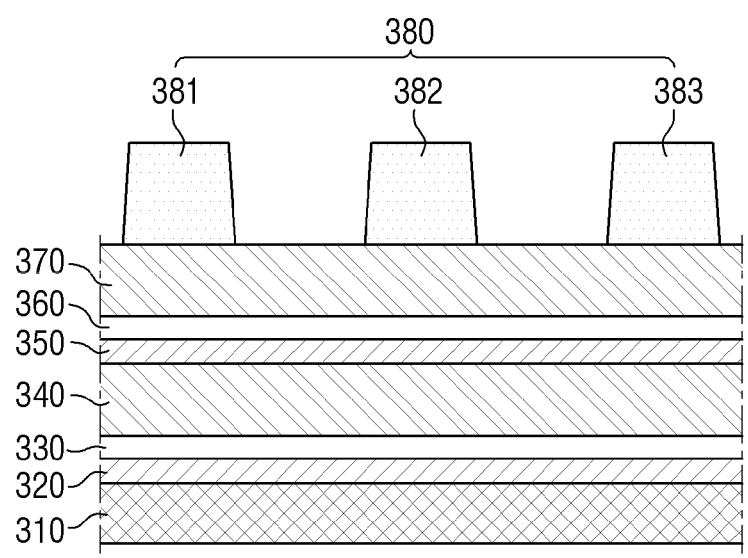
FIGS. 25, 26, 27, 28, 29, 30, 31, 32, 33, and 34 are schematic cross-sectional views illustrating a method of fabricating a wire grid polarizing plate according to a second embodiment of the present invention.

Referring to FIG. 25, a base substrate may include a light-transmitting substrate 310, conductive layers (320, 330), a guide layer 340, a hard mask layer 350, a capping layer 360, and a sacrificial layer 370.

The light-transmitting substrate 310 can be made of any material capable of transmitting visible light. The material that forms the light-transmitting substrate 310 may be selected according to various criteria, as above. Since the light-transmitting substrate 310 has been described above, a detailed description thereof is omitted.

The conductive layers (320, 330) can be made of any conductive material. The conductive layers (320, 330) may cover the whole of the light-transmitting substrate 310. The conductive layer (320, 330) may include a first conductive layer 320 and a second conductive layer 330.

The first conductive layer 320 may be made of, but is not limited to, a metal selected from aluminum (Al), chrome (Cr), silver (Ag), copper (Cu), nickel (Ni), titanium (Ti), cobalt (Co) and molybdenum (Mo) and/or any alloy of these metals.

The second conductive layer 330 may be made of a material having a lower etch rate than that of the first conductive layer 320. For example, the first conductive layer 320 may be made of, but is not limited to, aluminum, and the second conductive layer 330 may be made of, but is not limited to, titanium or molybdenum.

The guide layer 340 may be formed on the second conductive layer 330. The guide layer 340 may cover the whole of the second conductive layer 330. The guide layer 340 may be made of a material having a higher etch rate than that of the second conductive layer 330. For example, the guide layer 340 may be made of, but is not limited to, silicon nitride (SiNx).

The hard mask layer 350 may be formed on the guide layer 340. The hard mask layer 350 may cover the whole of the guide layer 340. The hard mask layer 350 may be made of a material having a lower etch rate than that of the guide layer 340. For example, the hard mask layer 350 may be, but is not limited to, aluminum.

The capping layer 360 may be formed on the hard mask layer 350. The capping layer 360 may cover the whole of the hard mask layer 350. The capping layer 360 can prevent the above-described hillock phenomenon from occurring in the hard mask layer 350. The capping layer 360 may be made of a material having a lower etch rate than that of the hard mask layer 350. The capping layer 360 may be made of, but is not limited to, titanium. The capping layer 360 can also be omitted.

The sacrificial layer 370 may be formed on the hard mask layer 350. The sacrificial layer 370 may cover the whole of the hard mask layer 350. The sacrificial layer 370 may be made of a material having a higher etch rate than that of the capping layer 360. For example, the sacrificial layer 370 may be made of, but is not limited to, silicon nitride (SiNx).

A first photosensitive film pattern layer 380 may be formed on the sacrificial layer 370. The first photosensitive film pattern layer 380 may be formed using photolithography. First photosensitive film patterns 381 through 383 may be formed on the sacrificial layer 370 to be separated from each other, and the sacrificial layer 370 may be partially exposed between the first photosensitive film patterns 381 through 383.

Figure 26:
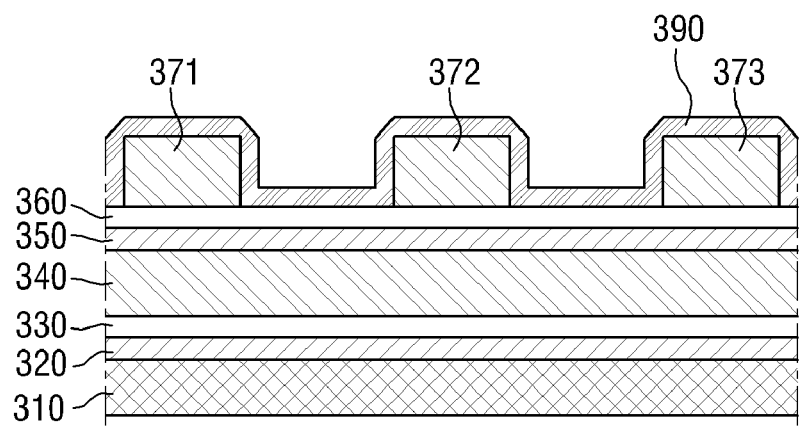

Referring to FIGS. 25 and 26, sacrificial layer patterns 371 through 373 may be formed on the capping layer 360. The sacrificial layer patterns 371 through 373 may be formed by patterning the sacrificial layer 370 using the first photosensitive film patterns 381 through 383 as a mask.

A spacer layer 390 may be formed on the sacrificial layer patterns 371 through 373 and the capping layer 360. The spacer layer 390 may cover the sacrificial layer patterns 371 through 373 and the whole of the capping layer 360 exposed between the sacrificial layer patterns 371 through 373. As an example, the spacer layer 390 may be made of silicon oxide (SiOx).

Figure 27:
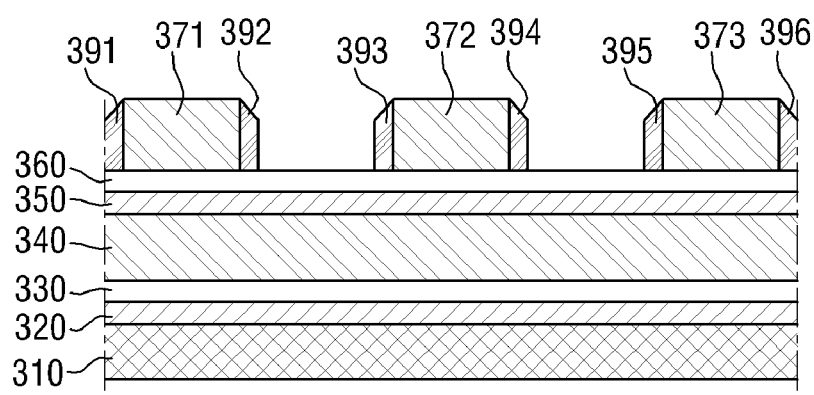

Referring to FIGS. 26 and 27, spacer patterns 391 through 396 may be formed by patterning the spacer layer 390. Specifically, the spacer patterns 391 through 396 may cover side surfaces of the sacrificial layer patterns 371 through 373. The capping layer 360 may be partially exposed between the spacer patterns 391 through 396. Upper surfaces of the sacrificial layer patterns 371 through 373 may also be exposed between the spacer patterns 391 through 396.

Figure 28:
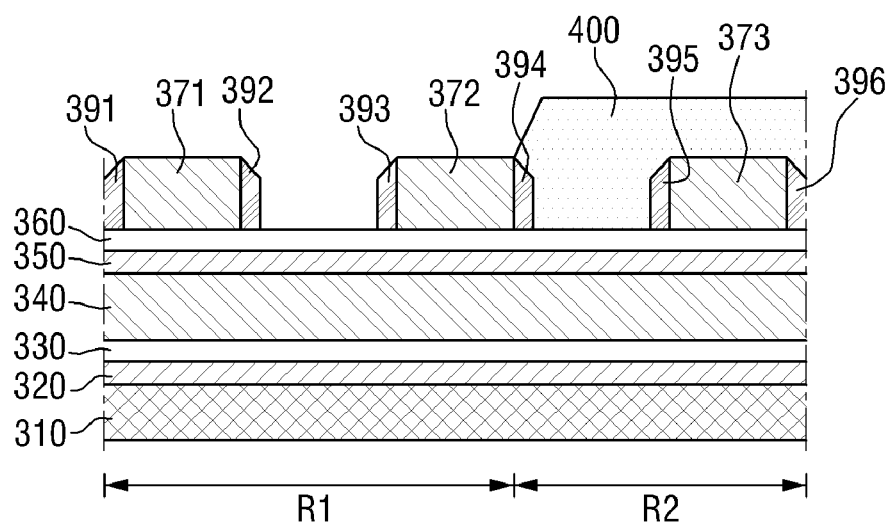

Referring to FIG. 28, a second photosensitive film pattern 400 may be formed only in a second region R2 and not in a first region R1. The first region R1 is a region in which a wire grid pattern PT (see FIG. 34) is to be formed, and the second region R2 is a region in which a reflective pattern RF (see FIG. 34) is to be formed. In other words, the second photosensitive pattern 400 may protect the region in which the reflective pattern RF (see FIG. 34) is to be formed.

Figure 29:
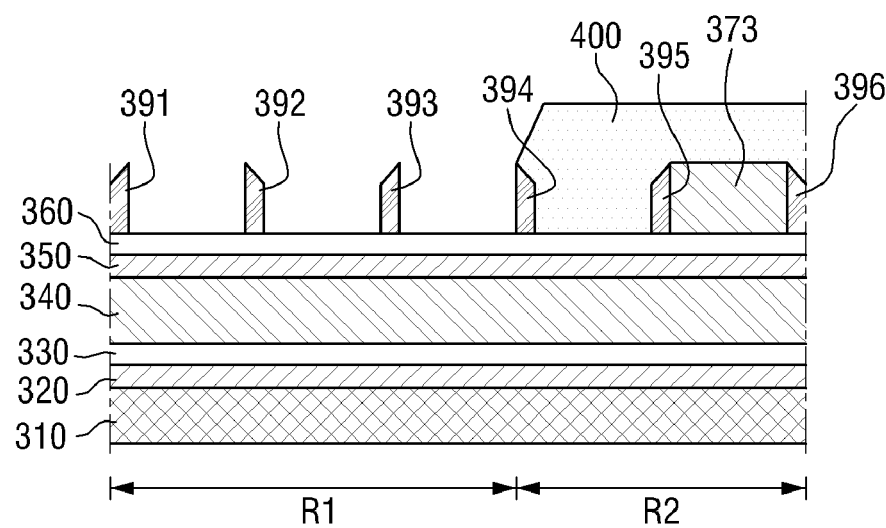

Referring to FIG. 29, the sacrificial layer patterns 371 and 372 in the first region R1 may be removed. Unlike the sacrificial layer patterns 371 and 372, the sacrificial layer pattern 373 is protected by the second photosensitive film pattern 400 and thus is not removed. After the removal of the sacrificial layer patterns 371 and 372, the capping layer 360 may be partially exposed between the spacer patterns 391 through 394 in the first region R1.

Figure 30:
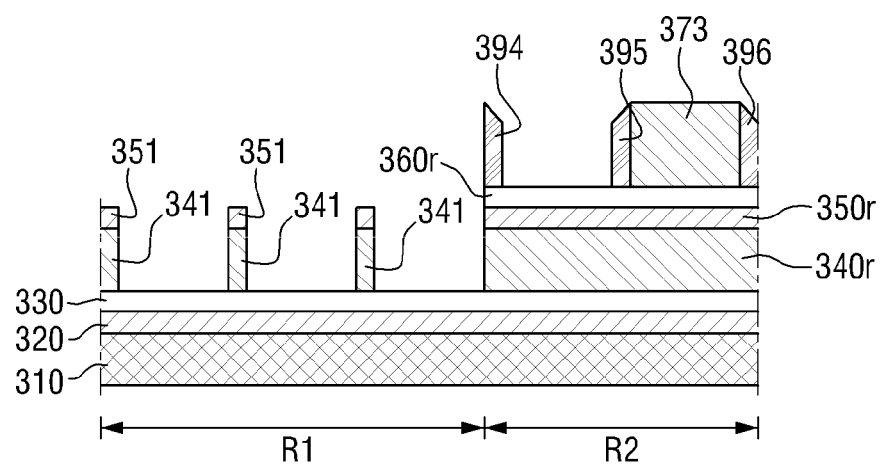

Referring to FIGS. 29 and 30, in a state where the second region R2 is protected by the second photosensitive film pattern 400, the hard mask layer 350 and the guide layer 340 of the first region R1 may be patterned using the spacer patterns 391 through 394 as a mask. As a result, first hard mask patterns 351 and guide patterns 341 may be formed on the second conductive layer 330 in the first region R1. Although not illustrated in the drawings, part of the capping layer 360 may remain on the hard mask patterns 351.

The guide patterns 341 of the first region R1, or the guide patterns 341 and the first hard mask patterns 351 together, may correspond to the first guide pattern 1GP described above.

The second photosensitive film pattern 400 may be removed after the formation of the first hard mask patterns 351 and the guide patterns 341. In the second region R2, a first remaining capping layer pattern 360r, a first remaining hard mask pattern 350r, and a remaining guide pattern 340r may be formed.

The remaining guide pattern 340r or the first remaining capping layer pattern 360r, the first remaining hard mask pattern 350r and the remaining guide pattern 340r may correspond to the third guide pattern 3GP described above.

Figure 31:
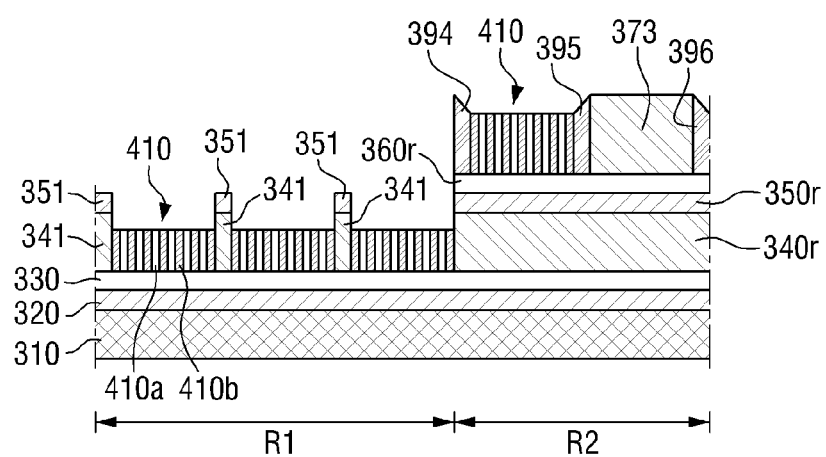

Referring to FIG. 31, a self-assembled block copolymer layer 410 may be formed between the guide patterns 341 and between the spacer patterns 394 and 395. The self-assembled block copolymer layer 410 may include first domains 410a and second domains 410b. Since the self-assembled block copolymer layer 410 has been described above, a detailed description thereof is omitted.

Although not illustrated in the drawing, a neutral layer (not illustrated) which controls the vertical alignment of a first repeating unit and a second repeating unit of a block copolymer may be formed on a bottom portion of each trench between the guide patterns 341, that is, on the second conductive layer 330 and within each trench. Since the neutral layer has been described above, a detailed description thereof is omitted.

In addition, surfaces of the guide patterns 341 may be processed to become hydrophobic. For example, the surfaces of the guide patterns 341 may be processed to become hydrophobic by, but not limited to, a fluorine-based polymer coating process or a fluorine-based gas plasma treatment process.

Figure 32:
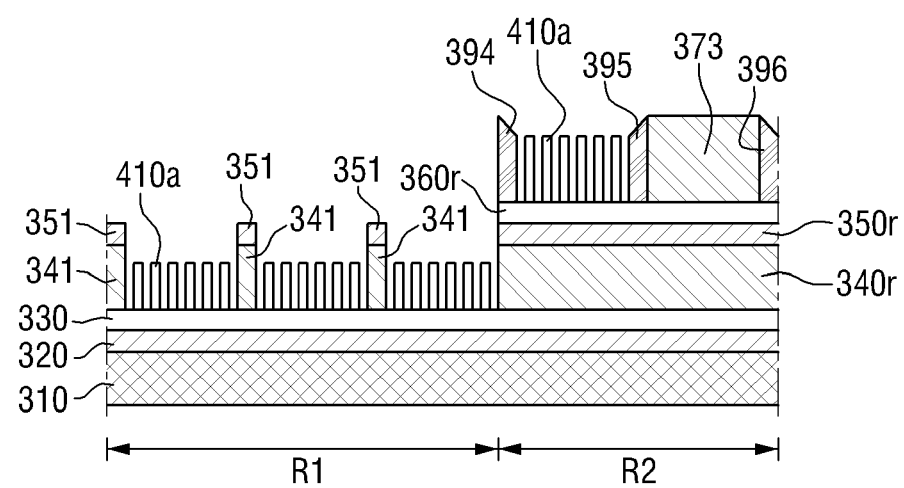

Referring to FIGS. 31 and 32, of the first and second domains 410a and 410b, the second domains 410b only may be removed. For example, the process of removing only the second domains 410b but not the first domains 410a may use a solvent having high affinity for the second domains 410b, as described above.

Figure 33:
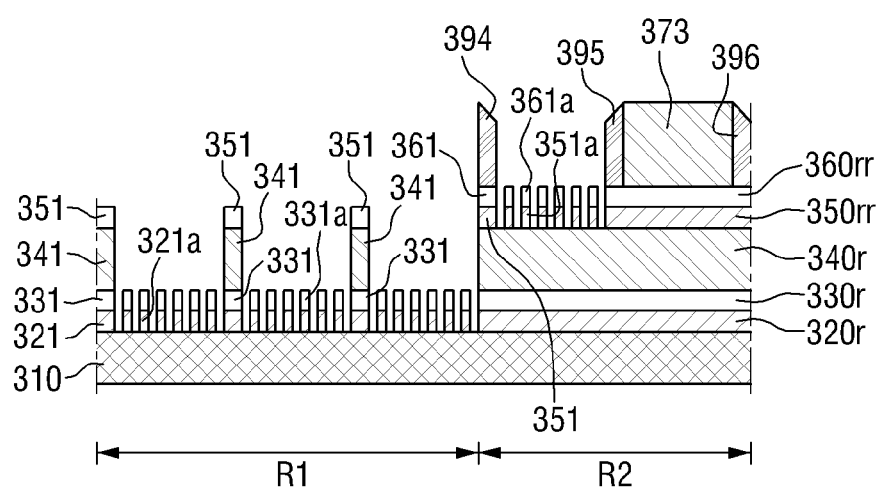

Referring to FIGS. 32 and 33, the first and second conductive layers 320 and 330 in the first region R1 may be patterned using the first domains 410a and the guide patterns 341 as a mask. As a result, a first conductive pattern layer (321, 321a) and a second conductive pattern layer (331, 331a) may be formed in the first region R1. The first conductive pattern layer (321, 321a) may be disposed under the second conductive pattern layer (331, 331a).

In the second region R2, the first remaining capping layer pattern 360r and the first remaining hard mask pattern 350r may be patterned using the spacer patterns 394 through 396 and the sacrificial layer pattern 373 as a mask. As a result, capping layer patterns 361 and 361a, second hard mask patterns 351 and 351a, a second remaining capping layer pattern 360rr, and a second remaining hard mask pattern 350rr may be formed in the second region R2. In addition, the patterning of the first and second conductive layers 320 and 330 of the first region R1 may result in the formation of remaining conductive patterns 320r and 330r in the second region R2.

Figure 34:
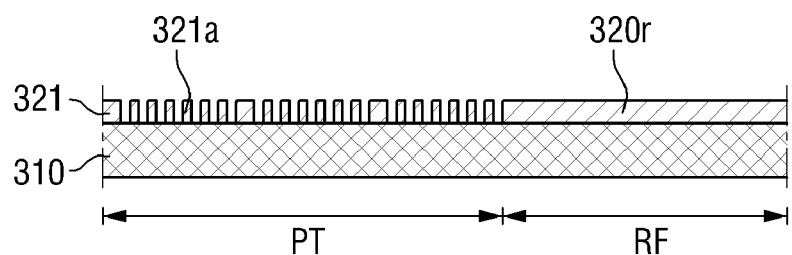

Referring to FIGS. 33 and 34, first conductive patterns 321 and 321a and the remaining conductive pattern 320r only may be formed on the light-transmitting substrate 310. That is, all patterns overlying patterns 321, 321a, and 320r may be removed.

The first conductive patterns 321 and 321a may form the wire grid pattern PT, and the remaining conductive pattern 320r may form the reflective pattern RF. The first conductive patterns 321a may correspond to the conductive barrier ribs 121W described above, and the first conductive wire patterns 321 may correspond to the conductive barrier ribs 121R described above.

Embodiments of the present invention provide at least one of the following advantages.

An embodiment of the present invention may provide a polarizing plate having improved light efficiency.

An embodiment of the present invention may provide a display device having improved light efficiency.

An embodiment of the present invention may provide a method of fabricating a display device having improved light efficiency.

However, the effects of the present invention are not restricted to the ones set forth herein. The above and other effects of the present invention will become more apparent to one of ordinary skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. Furthermore, different features of the various embodiments, disclosed or otherwise understood, can be mixed and matched in any manner to produce further embodiments within the scope of the invention.

What is claimed is:

1. A wire grid polarizing plate comprising:
a light-transmitting substrate; and
wire grid patterns which are disposed on the light-transmitting substrate, and which are arranged to transmit first polarized light and to reflect second polarized light polarized in a direction perpendicular to that of the first polarized light, the wire grid patterns comprising a first conductive structure and a second conductive structure,
wherein the first conductive structure comprises two first-type wire structures extending parallel to each other in a first direction and comprises at least one second-type wire structure extending in a second direction perpendicular to the first direction and connecting the two first-type wire structures,
wherein the second conductive structure comprises two third-type wire structures extending parallel to each other in the first direction and comprises at least one fourth-type wire structure extending in the second direction and connecting the two third-type wire structures,
wherein the first conductive structure is separated from the second conductive structure,
wherein a total length of the first conductive structure is unequal to a total length of the second conductive structure.

* * * * *